(12) United States Patent
Gao et al.

(10) Patent No.: US 10,038,653 B2
(45) Date of Patent: Jul. 31, 2018

(54) VISUAL EDITOR FOR ELECTRONIC MAIL

(71) Applicant: CONSTANT CONTACT, INC., Waltham, MA (US)

(72) Inventors: Yan Gao, Brighton, MA (US); Sridhar Gorantla, Ashland, MA (US); Paul McLaughlin, Burlington, MA (US); Michael Fitterman, Harvard, MA (US)

(73) Assignee: CONSTANT CONTACT, INC., Waltham, MA (US)

( * ) Notice: Subject to any disclaimer, the term of this patent is extended or adjusted under 35 U.S.C. 154(b) by 224 days.

(21) Appl. No.: 14/982,237

(22) Filed: Dec. 29, 2015

(65) Prior Publication Data

US 2016/0308805 A1 Oct. 20, 2016

Related U.S. Application Data

(63) Continuation of application No. 13/361,735, filed on Jan. 30, 2012, now Pat. No. 9,256,586, which is a (Continued)

(51) Int. Cl.
*G06F 17/00* (2006.01)
*H04L 12/58* (2006.01)
(Continued)

(52) U.S. Cl.
CPC .......... *H04L 51/066* (2013.01); *G06F 17/211* (2013.01); *G06F 17/24* (2013.01);
(Continued)

(58) Field of Classification Search
CPC ... G06F 17/211; G06F 17/212; G06F 17/3089
See application file for complete search history.

(56) References Cited

U.S. PATENT DOCUMENTS

| 6,430,576 | B1 | 8/2002 | Gates et al. |
| 6,697,824 | B1 | 2/2004 | Bowman-Amuah |

(Continued)

FOREIGN PATENT DOCUMENTS

| JP | 2003-085033 A | | 3/2003 |
| JP | 2003085033 A | * | 3/2003 |

OTHER PUBLICATIONS

International Search Report for PCT/US2008/051620 dated Jun. 23, 2008.

*Primary Examiner* — Laurie A Ries
(74) *Attorney, Agent, or Firm* — Lando & Anastasi, LLP

(57) ABSTRACT

A computer-implemented method is provided for generating at least one custom email message based, at least in part, on input from a user of a computer system, the computer system having a display. The method comprises acts of presenting, to the user in the display of the computer system, an editor interface displaying an initial approximation of an email message comprising a plurality of content blocks; accepting, through the editor interface, at least one customization of at least one of a content of at least one of the plurality of content blocks and a layout of the plurality of content blocks; and displaying through the editor interface a customized approximation of the email message based, at least in part, on the initial approximation of the email message and the at least one customization.

22 Claims, 30 Drawing Sheets

Related U.S. Application Data continuation of application No. 11/655,731, filed on Jan. 19, 2007, now Pat. No. 8,108,763.

(51) Int. Cl.
| | |
|---|---|
| *G06F 17/21* | (2006.01) |
| *G06F 17/24* | (2006.01) |
| *G06Q 10/10* | (2012.01) |
| *G06Q 30/02* | (2012.01) |
| *H04L 29/08* | (2006.01) |

(52) U.S. Cl.
CPC .......... *G06Q 10/107* (2013.01); *G06Q 30/02* (2013.01); *H04L 51/046* (2013.01); *H04L 67/02* (2013.01)

(56) References Cited

U.S. PATENT DOCUMENTS

| | | | | |
|---|---|---|---|---|
| 6,707,472 B1* | 3/2004 | Grauman | ............ | G06Q 10/107 379/93.24 |
| 6,769,015 B1* | 7/2004 | Bates | ................ | G06Q 10/107 709/206 |
| 7,010,546 B1* | 3/2006 | Kolawa | ............... | G06F 11/3688 707/694 |
| 7,076,730 B1* | 7/2006 | Baker | ....................... | G06F 9/44 709/206 |
| 7,111,057 B1 | 9/2006 | Sherman et al. | | |
| 7,401,289 B2* | 7/2008 | Lachhwani | ........... | G06F 17/212 707/E17.116 |
| 7,424,676 B1* | 9/2008 | Carlson | ................ | G06Q 10/107 715/273 |
| 7,707,495 B2* | 4/2010 | Hosotsubo | ............ | G06F 17/248 715/234 |
| 7,779,352 B1* | 8/2010 | Underwood | ........ | G06F 17/3089 715/250 |
| 2002/0120543 A1* | 8/2002 | Brittingham | ........... | G06Q 10/10 705/36 R |
| 2002/0138582 A1* | 9/2002 | Chandra | ................ | G06Q 10/10 709/206 |
| 2003/0041050 A1 | 2/2003 | Smith et al. | | |
| 2003/0065776 A1 | 4/2003 | Malik et al. | | |
| 2003/0088824 A1* | 5/2003 | Ayan | ...................... | G06Q 30/02 715/201 |
| 2003/0233620 A1* | 12/2003 | Vedullapalli | .......... | G06F 17/211 715/209 |
| 2005/0039028 A1* | 2/2005 | Eason | ................. | H04L 63/0428 713/187 |
| 2005/0076087 A1 | 4/2005 | Budd et al. | | |
| 2005/0240596 A1 | 10/2005 | Worthen et al. | | |
| 2005/0273707 A1 | 12/2005 | Chu et al. | | |
| 2006/0248442 A1* | 11/2006 | Rosenstein | ............. | G06F 17/24 715/205 |
| 2007/0038717 A1 | 2/2007 | Burkholder et al. | | |
| 2007/0060099 A1* | 3/2007 | Ramer | ............. | G06F 17/30867 455/405 |
| 2007/0113282 A1* | 5/2007 | Ross | ....................... | G06F 21/52 726/22 |
| 2007/0185911 A1* | 8/2007 | Thambidurai | ......... | G06Q 30/02 |
| 2007/0186157 A1 | 8/2007 | Walker et al. | | |
| 2008/0021748 A1 | 1/2008 | Bay et al. | | |
| 2008/0047001 A1* | 2/2008 | Bellagamba | .......... | G06F 3/1205 726/17 |
| 2008/0052619 A1* | 2/2008 | Illg | ........................ | G06F 17/273 715/257 |
| 2008/0052634 A1* | 2/2008 | Fishkin | ............. | G06F 17/30899 715/753 |
| 2008/0059474 A1 | 3/2008 | Lim | | |
| 2008/0065982 A1 | 3/2008 | Evanchik et al. | | |
| 2008/0177800 A1 | 7/2008 | Arkhipov et al. | | |
| 2009/0089131 A1 | 4/2009 | Moukas et al. | | |
| 2009/0094514 A1* | 4/2009 | Dargahi | ....................... | G06F 17/24 715/255 |
| 2010/0251143 A1 | 9/2010 | Thomas et al. | | |
| 2012/0204095 A1* | 8/2012 | Gao | ....................... | G06F 17/24 715/234 |
| 2014/0331124 A1 | 11/2014 | Downs et al. | | |

\* cited by examiner

VISUAL EDITOR FOR ELECTRONIC MAIL

CROSS-REFERENCE TO RELATED APPLICATIONS

This application is a continuation of and claims the benefit under 35 U.S.C. § 120 of U.S. application Ser. No. 13/361,735, entitled "VISUAL EDITOR FOR ELECTRONIC MAIL," filed on Jan. 30, 2012, which is a continuation of and claims the benefit under 35 U.S.C. § 120 of U.S. application Ser. No. 11/655,731, entitled "VISUAL EDITOR FOR ELECTRONIC MAIL," filed on Jan. 19, 2007, now U.S. Pat. No. 8,108,763, which applications are hereby incorporated herein by reference in their entirety.

BACKGROUND

1. Field of Invention

The instant invention relates to designing electronic mail (email) messages, and, more particularly, the instant invention relates to the editing of content and layout of email messages.

2. Discussion of Related Art

One way organizations have typically provided information, such as advertisements, coupons, news, etc., to customers, members, and/or the public in general is through mass distributions of mail. The Internet allows distribution of information to be performed cheaper and quicker through email rather than traditional mail. Using email, an organization can generate an email message containing, for example, an advertisement or a newsletter and nearly instantly send the email to recipients around the world.

Despite the cost reduction in distributing information by sending email rather than traditional mail, organizations, such as corporations, non-profit groups, and community or religious organizations, can still spend large amounts of money and time to prepare and transmit an effective email campaign to a large number of recipients. For example, organizations may hire designers to design email layouts, graphics, text, and advertising elements individualized for each email campaign. Organizations may also purchase computer systems to generate and transmit the email and hire technology experts to upkeep these computer systems. To ease the creation of effective email campaigns, email design tools have been developed. Such tools include wizards and templates that provide organizations with tools to more easily design effective email campaigns. Furthermore, email transmission services have been developed that manage recipient lists and transmit email messages. Such services allow an organization to transmit large numbers of email messages to extensive recipient lists without the need to purchase specialized computer systems or hire experts to maintain such computer systems.

SUMMARY OF INVENTION

In one aspect of the instant invention, it is realized that an editor that allows a user to visually edit the layout and content of email messages may ease the design of such email messages. In particular, an email designer may easily design email messages using a visual editor that displays an approximation of an email message through which customization to content and layout of the email message may be performed.

In another aspect of the instant invention, it is further realized that tracking customization of an email message with a user interface server by storing information in local memory may enable fast spell-checking, previewing, and anti-spam functionality through an editor interface. Such tracking, for example, may, in some implementations, allow these functions to be performed without a relatively slow database query. Such a function may be advantageous, for instance, in an Internet-based email editing system.

In one aspect of the instant invention, it is further realized that a plurality of substantially modular renderers may produce convenient visual editor functionality based on a single stored representation of an email message. In some implementations, the plurality of renderers may generate different output representations of an email message based on desired output characteristics.

One aspect of the instant invention includes a computer-implemented method for generating at least one custom email message based, at least in part, on input from a user of a computer system, the computer system having a display. In some embodiments, the method comprises acts of presenting, to the user in the display of the computer system, an editor interface displaying an initial approximation of an email message comprising a plurality of content blocks; accepting, through the editor interface, at least one customization of at least one of a content of at least one of the plurality of content blocks and a layout of the plurality of content blocks; and displaying through the editor interface a customized approximation of the email message based, at least in part, on the initial approximation of the email message and the at least one customization.

In some embodiments, the initial approximation includes a representation of a template document. Some embodiments further comprise an act of receiving an indication of the template document from the user. In some embodiments, the template document includes an extensible markup language document. In some embodiments, the extensible markup language document defines each of the plurality of content blocks and a plurality of layout panels. Some embodiments further comprise an act of determining at least one control element of a control panel of the editor interface based, at least in part, on the template document. In some embodiments, the at least one control element includes at least one of a formatting element and a block adding interface. In some embodiments, the at least one customization includes a customization of the content of the at least one of the plurality of content blocks. In some embodiments, the customization of the content includes at least one of a customization of textual information, a customization of graphical information, a customization of data-driven information, a customization of partner information, and a customization of link information.

Some embodiments further comprise an act of saving a representation of the customized content of the at least one of the plurality of content blocks to at least one database table. Some embodiments further comprise an act of presenting, through the editor interface, a block interface allowing the user to customize the content of the at least one of the plurality of content blocks. In some embodiments, the block interface includes a hypertext markup language Iframe. In some embodiments, presenting the block interface includes displaying the hypertext markup language Iframe over the at least one of the plurality of content blocks. In some embodiments, presenting the block interface includes converting at least one cascading style sheet style class to at least one inline hypertext markup language style tag.

In some embodiments, the at least one customization includes a customization of the layout of the plurality of content blocks. In some embodiments, the customization of the layout includes a movement of at least one of the plurality of content blocks from an initial position to a desired position. In some embodiments, the customization of the layout includes at least one of an addition of a new content block to the plurality of content blocks and a deletion of one of the plurality of content blocks. Some embodiments further comprise an act of saving a representation of the content of the at least one of the plurality of content blocks in local memory of at least one user interface server.

Some embodiments further comprise an act of presenting, through the editor interface, at least one intermediate representation of the customization of the layout. In some embodiments, the at least one intermediate representation includes a representation of a movement of the at least one of the plurality of content blocks from an initial position to a desired position. In some embodiments, the at least one intermediate representation includes an indication of a location at which a new content block may be added. Some embodiments further comprise an act of generating the initial approximation. In some embodiments, generating the initial approximation comprises generating the initial approximation based, at least in part, on a representation of a document object model. In some embodiments, generating the initial approximation comprises inserting at least one JavaScript hook into a representation of a hypertext markup language document.

In some embodiments, the editor interface includes a webpage. In some embodiments, the webpage includes an AJAX based webpage. Some embodiments further comprise an act of generating the customized approximation. In some embodiments, generating the customized approximation includes updating at least one document object model based, at least in part, on the at least one customization. Some embodiments further comprise an act of accepting, through the editor interface, a global format change. Some embodiments further comprise an act of applying the global format change to the email message. In some embodiments, applying the global format change includes changing at least one attribute of at least one cascading style sheet class based, at least in part, on the global format change. In some embodiments, the global format change includes at least one of a textual change and a graphical change.

In some embodiments, accepting the at least one customization includes accepting the at least one customization through the editor interface while displaying at least a portion of the initial approximation. Some embodiments further comprise an act of inserting a pre-authored content block into the email message. Some embodiments further comprise acts of accepting, through the editor interface, at least one indication of an undo request for the at least one customization; and displaying through the editor interface the initial approximation of the email message. Some embodiments further comprise acts of accepting, through the editor interface, at least one indication of a redo request for the at least one customization; and displaying through the editor interface the customized approximation of the email message. Some embodiments further comprise acts of accepting, through the editor interface, at least one indication of a request to performing at least one of a spell check, an anti-spam check, and an insertion of data-driven content; and performing the at least one of the spell check, the anti-spam check, and the insertion of data driven content.

One aspect of the instant invention includes a computer-implemented method for generating at least one custom email message based, at least in part, on input from a user of a computer system, the computer system having a display. In some embodiments, the method comprises acts of presenting, to the user in the display of the computer system, an editor interface displaying an initial approximation of an email message comprising a plurality of content blocks; accepting, through the editor interface, a customization of a content of at least one of the plurality of content blocks; accepting, through the editor interface, a customization of a layout of the plurality of content blocks; tracking the customization of the content and customization of the layout in a memory of a user interface server; and storing at least a representation of the customized content of the at least one of the plurality of content blocks in at least one database table on a database server.

Some embodiments further comprise act of receiving an indication of a save request from the user. Some embodiments further comprise an act of in response to the save request, storing a representation of the at least one custom email message in the at least one database table on the database server. In some embodiments, presenting the editor interface includes transmitting the initial approximation of the email message from the user interface server to the user. In some embodiments, tracking the customization includes storing a representation of the initial approximation of the email message on the user interface server. In some embodiments, tracking the customization includes updating the representation of the initial approximation of the plurality of content blocks stored on the user interface server based, at least in part, on the customization of the content and the customization of the layout.

In some embodiments, accepting the customization includes receiving an indication of a save request from the user. Some embodiments further comprise an act of performing at least one of a spell check and an anti-spam check of at least a portion of the custom email message. In some embodiments, performing at least one of a spell check and an anti-spam check includes performing the at least one of the spell check and the anti-spam check using the tracked customization of the content and customization of the layout in the memory of the user interface server. In some embodiments, performing at least one of a spell check and an anti-spam check includes performing the at least one of the spell check and the anti-spam check using the tracked customization of the content and customization of the layout in the memory of the user interface server and without querying the database server for the representation of the customized content.

Some embodiments further comprise an act of displaying through the editor interface a customized approximation of the email message based, at least in part, on the initial approximation of the email message, the customization of the layout, and the customization of the content. Some embodiments further comprise an act of presenting, to the user in the display of the computer system, a preview representation of the custom email message. In some embodiments, the preview representation includes an approximation of the custom email message as the custom email message may appear to a recipient of the custom email message. In some embodiments, presenting the preview representation includes generating the preview representation. In some embodiments, presenting the preview representation includes generating the preview representation using the tracked customization of the content and customization of the layout. In some embodiments, presenting the preview representation includes generating the preview representation without querying the at least one database table after presenting the editor interface.

One aspect of the instant invention includes a computer-implemented method for generating at least one custom email message based, at least in part, on input from a user of a computer system, the computer system having a display. In some embodiments, the method comprises acts of receiving from the user an indication of a desired version of the custom email message; selecting an email renderer based, at least in part, on the indication of the desired version of the custom email message; rendering the desired version of the custom email message using the selected email renderer; and presenting, to the user in the display of the computer system, the desired version of the custom email message.

In some embodiments, the selected renderer includes at least one of a preview renderer, an editor renderer, and an edit text letter renderer. In some embodiments, the desired version includes a preview version and the selected renderer includes a preview renderer. In some embodiments, rendering includes generating a hypertext markup language representation of the custom email message based, at least in part, on a document object model representation of the custom email message. In some embodiments, rendering includes generating a text representation of the custom email message based, at least in part, on a document object model representation of the custom email message. In some embodiments, the preview representation includes an approximation of the custom email message as the custom email message may appear to a recipient of the custom email message.

In some embodiments, the desired version includes a preview for at least one of a device type, a format, and a program, and rendering includes generating a preview representation of the customized email message designed for the at least one of the device type, the format, and the program based, at least in part, on a document object model representation of the custom email message. In some embodiments, the desired version includes an editor version and the selected renderer includes an editor renderer. In some embodiments, rendering includes generating a hypertext markup language representation of the custom email message based, at least in part, on a document object model representation of the custom email message. In some embodiments, the editor version includes a plurality of JavaScript hooks that enable at least one customization of at least one of a content of at least one of the plurality of content blocks and a layout of the plurality of content blocks to be entered by the user through an editor interface.

Some embodiments further comprise an act of presenting, to the user in the display of the computer system, the editor interface displaying the editor version. In some embodiments, the desired version includes an editor for a device type, and rendering includes generating an editor representation of the customized email message designed for the device type based, at least in part, on a document object model representation of the custom email message.

In some embodiments, the desired version includes an edit text version and the selected renderer includes an edit text renderer. In some embodiments, rendering includes generating a text representation of the custom email message based, at least in part, on a document object model representation of the custom email message. In some embodiments, the edit text version is formatted to enable editing through an edit text interface.

Some embodiments further comprise an act of presenting, to the user in the display of the computer system, the edit text interface displaying the edit text version. In some embodiments, the desired version includes an editable version for at least one of a device type, a format, and a program, and the selected renderer includes an edit renderer for the respective at least one of the device type, the format, and the program. In some embodiments, rendering includes generating a respective edit representation of the custom email message based, at least in part, on a document object model representation of the custom email message. In some embodiments, the respective edit version is formatted to enable editing through an edit interface. Some embodiments further comprise an act of presenting, to the user in the display of the computer system, the edit interface displaying the edit text version.

In some embodiments, the desired version includes a live version and the selected renderer includes a preview renderer. In some embodiments, rendering includes generating a hypertext markup language representation of the custom email message based, at least in part, on a document object model representation of the custom email message. In some embodiments, rendering includes generating a text representation of the custom email message based, at least in part, on a document object model representation of the custom email message.

In some embodiments, rendering includes inserting at least on data driven element into the live version. Some embodiments further comprise an act of transmitting the live version to at least one recipient.

In some embodiments, the desired version includes a live version for at least one of a device type, a format, and a program, and rendering includes generating a live representation of the customized email message designed for the respective at least one of the device type, the format, and the program based, at least in part, on a document object model representation of the custom email message. Some embodiments further comprise acts of rendering a live version of the custom email message using a live renderer; and transmitting the live version to at least one recipient. In some embodiments, rendering the live version includes rendering the live version for a desired device type.

In some embodiments, wherein the live renderer includes a device specific live renderer. In some embodiments, wherein the live renderer includes a generic live renderer usable for a plurality of devices types. In some embodiments, the selected renderer includes at least one of a device type renderer, a format type renderer, and a program type renderer. In some embodiments, the at least one device type includes at least one of a cellular telephone, a general purpose computer, a personal digital assistant, a television, and a billboard. In some embodiments, the desired version respectively includes at least one of a version designed for the device type, a version designed for the format, and a version designed for the program.

Further features and advantages of the instant invention as well as the structure and operation of various embodiments of the instant invention are described in detail below with reference to the accompanying drawings. In the drawings, like reference numerals indicate like or functionally similar elements. Additionally, the left-most one or two digits of a reference numeral identifies the drawing in which the reference numeral first appears.

BRIEF DESCRIPTION OF THE DRAWINGS

The accompanying drawings are not intended to be drawn to scale. In the drawings, each identical or nearly identical component that is shown in various figures is represented by a like numeral. For purposes of clarity, not every component may be labeled in every drawing. In the drawings:

FIG. 16 shows an example partner integration interface according to an embodiment of the instant invention.

FIG. 21 shows an example special block editing interface according to an embodiment of the instant invention;

FIG. 29 shows an example entry interface according to an embodiment of the instant invention.

DETAILED DESCRIPTION

Figure 1:
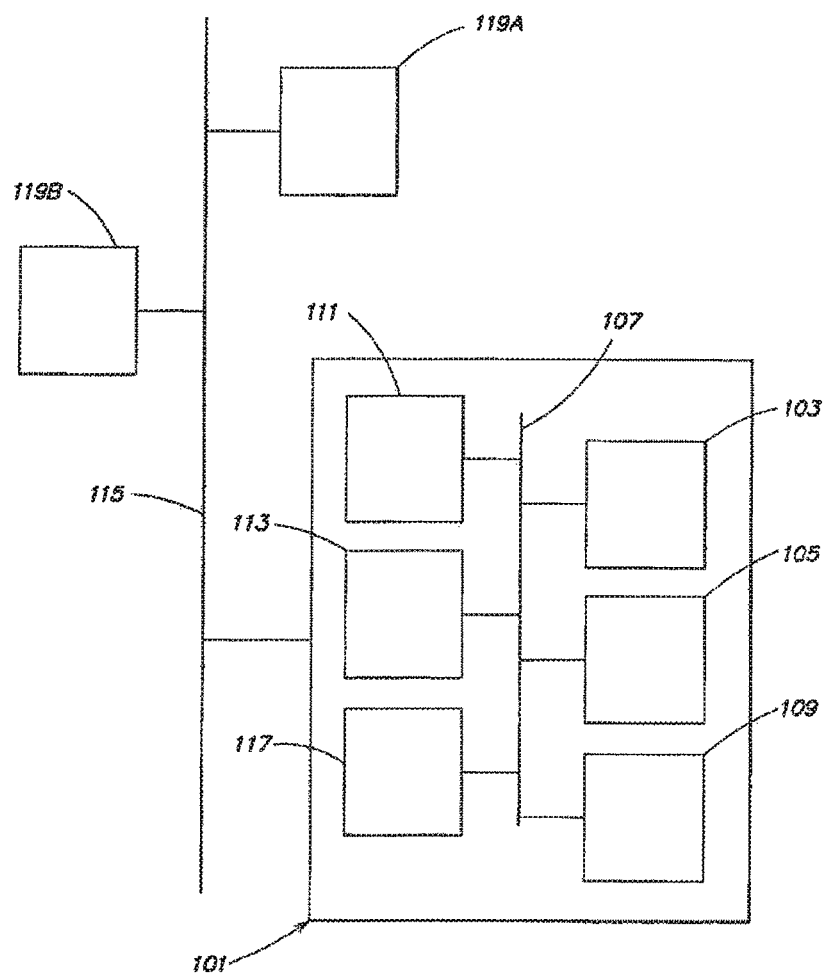
FIG. 1 shows a computer system architecture that may be suitable for implementing one or more aspects of the instant invention.

This invention is not limited in its application to the details of construction and the arrangement of components and acts set forth in the following description or shown in the drawings. The instant invention is capable of other embodiments and of being practiced or of being carried out in various ways. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items. Some embodiments of the instant invention relate generally to a visual editor for creating custom email messages. In some embodiments, the email messages may be used in large scale email campaigns in which the email messages are transmitted to a plurality of recipients identified in a recipient list.

In some embodiments, an editor interface is provided to a user of a computer system through a standard web browser. In one embodiment, the editor interface may be in the form of a program (e.g., executable, interpreted, etc.) downloaded to the user computer over a communication network such as the Internet. In some embodiments, the editor interface may be used to edit content and layout of an email message. In some embodiments, the editor interface may display a representation of an email message through which the user may customize the content and layout of the email message. By using a visual editor that allows content and layout customization, the user may more quickly and easily design custom email messages and make informed design decisions and alterations to the email message during the customization process.

In some embodiments, a user interface system may track customization of an email message by storing information in local memory to enable operations to be performed quickly on the email message. For example, in some implementations, spell-checking, previewing, and anti-spam functionality may be performed without a relatively slow database query.

In some embodiments, a plurality of substantially modular renderers (e.g., renderer processes executed by a computer system) may produce convenient visual editor functionality based on a single stored representation of an email message eliminating a need to maintain multiple representations of a single email message. In some implementations, the plurality of renderers may generate different output representations of an email message based on desired output characteristics.

General Purpose Computer System

Various aspects of the instant invention may be implemented on one or more computer systems. These computer systems may include, for example, general-purpose computers such as those based on Intel PENTIUM-type or Core-type processor; Motorola PowerPC; AMD Athlon, Turion or Opteron; Sun UltraSPARC; Hewlett-Packard PA-RISC processors; or any other type of processor. A computer system may include a single computer or may be distributed among multiple computers attached by a communication network.

A computer system according to one embodiment may be configured to perform any of the described functions, including but not limited to, storing, transmitting, editing, formatting, tracking, retrieving, inserting information, managing information, sharing information, and communicating with remote systems such as image servers, billing servers, email recipients, partners, and merchants. It should be appreciated that the instant invention is not limited to having any particular function or set of functions.

FIG. 1 shows a block diagram of a general purpose computer and network in which various aspects of the instant invention may be practiced. For example, various aspects of the instant invention may be implemented as specialized software executing on one or more computer systems including general-purpose computer system 101 shown in FIG. 1. Computer system 101 may include a general-purpose computer system that is programmable using a high-level computer programming language. Computer system 101 also may be implemented using specially programmed, special purpose hardware. In computer system 101, one or more processors 103 typically include a commercially available processor such as the well-known Pentium or Core class processors available from the Intel Corporation or the well-known Athlon or Opteron class processors available from the AMD Corporation. Many other processors are available. Such a processor usually executes an operating system which may include, for example, the Windows-based operating systems (e.g., Windows NT, Windows 2000 (Windows ME), Windows XP, Windows Vista operating systems) available from the Microsoft Corporation, MAC OS System X operating system available from Apple Computer, one or more of the Linux-based operating system distributions (e.g., the Enterprise Linux operating system available from Red Hat Inc.), the Solaris operating system available from Sun Microsystems, or UNIX operating systems available from various sources. Many other operating systems may be used, and the instant invention is not limited to any particular operating system.

The processor and operating system together may define a computer platform for which application programs in high-level programming languages are written. It should be understood that the instant invention is not limited to a particular computer system platform, processor, operating system, or network. Further, it should be appreciated that appropriate programming languages and appropriate computer systems other than those mentioned herein could also be used.

Various embodiments of the instant invention may be programmed using an object-oriented programming language, such as SmallTalk, Java, C++, Ada, Python, or C# (C-Sharp), functional programming languages, scripting languages such as JavaScript, and/or logical programming languages may be used. Various aspects of instant invention may be implemented in a non-programmed environment, such as documents created in hypertext markup language (HTML), extensible markup language (XML) or other format that, when viewed in a window of a browser program, render aspects of a graphical user interface (GUI) or perform other functions. Various aspects of instant invention may be implemented as programmed or non-programmed elements, or any combination thereof. For example, some embodiments of the instant invention may be implemented using a set of programming languages and techniques known as AJAX to provide a user with a web-based editor interface.

Computer system 101 may also include one or more memory devices 105, such as a disk drive, memory, or other device for storing data, connected to the processor 103. Memory 105 is typically used for storing programs and data during operation of the computer system 101. Components of computer system 101 may be coupled by an interconnection mechanism such as network 107, which may include one or more busses (e.g., between components that are integrated within a same machine) and/or a network (e.g., between components that reside on separate discrete machines). The interconnection mechanism enables communications (e.g., data, instructions) to be exchanged between system components of computer system 101.

Computer system 101 may also include one or more input/output (I/O) devices 109, for example, a keyboard, mouse, trackball, microphone, touch screen, printing device, display screen 111, speaker, etc. In addition, computer system 101 may contain one or more interfaces (e.g., network communication device 113) that connect computer system 101 to a communication network 115 (in addition or as an alternative to the network 107).

Computer system 101 may include one or more storage systems 117. The storage system 117 may include a computer readable and writeable nonvolatile recording medium in which signals are stored that define a program to be executed by the processor or information stored on or in the medium to be processed by the program. The medium may, for example, be a disk or flash memory. Typically, in operation, the processor causes data to be read from the nonvolatile recording medium into another memory that allows for faster access to the information by the processor than does the non-volatile medium. This memory is typically a volatile, random access memory such as a dynamic random access memory (DRAM) or static memory (SRAM). The memory may be located in storage system 117, as shown, or in memory system 105. The processor 103 generally manipulates the data within the integrated circuit memory 103, and then copies the data to the medium associated with storage system 117 after processing is completed. A variety of mechanisms are known for managing data movement between the medium and integrated circuit memory element and the instant invention is not limited thereto. The instant invention is not limited to a particular memory system or storage system.

The computer system may include specially-programmed, special-purpose hardware, for example, an application-specific integrated circuit (ASIC). Aspects of the instant invention may be implemented in software, hardware or firmware, or any combination thereof. Further, such methods, acts, systems, system elements and components thereof may be implemented as part of the computer system described above or as an independent component.

Although computer system 101 is shown by way of example as one type of computer system upon which various aspects of the instant invention may be practiced, it should be appreciated that aspects of the instant invention are not limited to being implemented on the computer system as shown in FIG. 1. Various aspects of the instant invention may be practiced on one or more computers having different architectures or components than that shown in FIG. 1.

Specifically, one or more portions of the computer system may be distributed across one or more computer systems coupled to the communications network 115 such as computer systems 119A and 119B. These computer systems also may include general-purpose computer systems. For example, various aspects of the instant invention may be distributed among one or more computer systems (e.g., servers) configured to provide a service to one or more client computers, or to perform an overall task or part of an overall task as part of a distributed system, as described below. For example, various aspects of the instant invention may be performed on a client-server or multi-tier system that includes program components distributed among one or more server systems that perform various functions according to various embodiments of the instant invention, as described below. These components may include executable, intermediate and/or interpreted code which communicate over a communication network (e.g., the Internet) using a communication protocol (e.g., transmission control protocol/Internet protocol (TCP/IP)). It should be appreciated that the instant invention is not limited to any particular system or group of systems. Also, it should be appreciated that the instant invention is not limited to any particular distributed architecture, network, or communication protocol.

Example Distributed System Architecture

Figure 2:
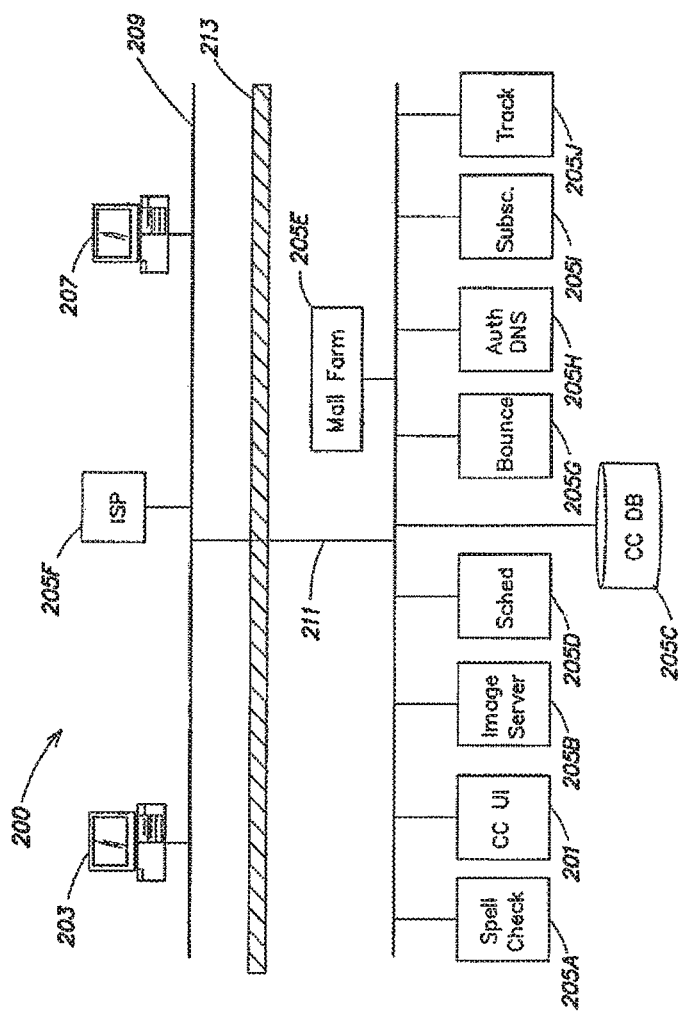
FIG. 2 shows a distributed system that may be used to perform one or more acts in accordance with some embodiments of the instant invention.

FIG. 2 shows an architecture diagram of an example distributed system 200 that may perform various aspects of some embodiments of the instant invention.

For example, one or more computer systems may act as a user interface system 201 that responds to requests from a user of the editor interface (e.g., a user of user computer 203). User interface system 201 may communicate with other computer systems (e.g., 205A-J, 207), to obtain and provide information that may be needed to respond to user requests, store information, track relevant data and events, and distribute email messages. Such computer systems may include, for example, general-purpose computer systems as discussed above with reference to FIG. 1.

It should be appreciated that FIG. 2 is used for example purposes only, and that other architectures may be used to facilitate one or more aspects of the instant invention. For example, in some embodiments, each identified computer system of FIG. 2 may include a plurality of computer systems configured to perform the functions identified with the computer systems below. Additional and/or alternative functions or distributions of functions may be performed by computer systems in other embodiments.

As shown in FIG. 2, distributed system 200 may be configured to perform any functions, including but not limited to, storing, transmitting, editing, formatting, distributing, tracking, retrieving, and inserting information. The computer systems of system 200 may be coupled together by one or more communication networks 209, 211. Communication network 209, in some implementations, may include the Internet. Communication network 211, in some implementations, may include a local area network (LAN). Firewall 213 may separate LAN 211 from the Internet 209 and allow only desired communication to pass between LAN 211 and the Internet 209.

Each computer system of system 200 may be configured to perform a specific function for system 200. For example, in one embodiment of the instant invention, user interface system 201, as discussed above, may be configured to perform a plurality of functions related to providing an editor interface to a user, such as receiving, transmitting, and/or processing hypertext transfer protocol (HTTP) messages, extensible markup language hypertext transfer protocol (XMLHTTP) requests, and/or other electronic messages. To perform such functions, system 201 may execute one or more server processes (e.g., computer programs) that receive and respond to requests from one or more remote client systems (e.g., user computer 203). In one implementation, for example, user interface system 201 may execute a WebSphere Application Sever 6.0 process.

User interface system 201 may be configured to receive and transmits electronic messages to and from user computer 203 through LAN 211, firewall 213 and the Internet 209. In some implementations, user computer 203 may be configured to execute a standard web browser program, such as Internet Explorer, that communicates with user interface system 201. In some implementations, the web browser program may be configured to execute one or more additional computer programs, such as a JavaScript program received from user interface system 201. In some implementations, the web browser may be configured to display one or more webpages based on AJAX. In some implementations, the web browser may be configured to retrieve information for one or more webpages by using an XMLHTTP request to a remote server (e.g., user interface system 201) rather than reloading an entire webpage to provide a more interactive web-based experience to a user.

In some implementations, user interface system 201 may be configured to execute one or more renderer processes (i.e., processes that output representations of email messages) that may be used, for example, to generate a representation of an email message from a representation of a document object model (DOM) (i.e., a collection of information such as objects and classes that represent at least a portion of an email message), as described in more detail below. In some implementations, user interface system 201 may also track customization of an email message being edited by a user through an editor interface. For example, user interface server 201 may store an initial representation of an email message when the editor interface is first provided to the user (e.g., by the user interface server 201). User interface server 201 may then update the stored representation as the email message is customized (e.g., by recording updated representations of the email message sent during server level processes, for example using HTTP messages).

In some implementations, user interface system 201 may be configured to execute an email manager process. The email manager process may manager operation of the renderers, tracking of DOM representations, communication of a database table, and any other desired email management functions.

According to one embodiment, computer system 205A may be configured to provide spell checking for a user of user computer 203. For example, computer system 205A may execute a server process that checks the spelling of a received email message. If a user of computer 203 selects to perform a spell check on an email message or part of an email message, as described below, computer system 205A may perform the spell check on the email message or the part of the email message and provide the user with an indication of a result of the spell check.

According to one embodiment, image server 205B may be configured to manage the storing and transmission of images. Images, for example, may be image files incorporated into one or more email messages designed by a user of user computer 203. Images may be in any image format, including the well known Joint Photographic Experts Group (JPEG), windows bitmap (BMP), and graphics interchange format (GIF) formats. In some implementations, image server 205B may also be configured to provide images to recipients (e.g., a user of recipient computer 207) of an email message designed by a user of user computer 203. In some implementations, image server 205B may provide a copy of the images to mirror servers outside of LAN 211 to decrease communication through firewall 213 and within LAN 211 when users access those images (e.g. during editing, recipients of transmitted email messages).

According to one embodiment, database server 205C may be configured to provide access to one or more databases. Database server 205C, for example, may execute a well known database server process such as an SQL database process (e.g., an SQL server available from the Oracle Corporation, Red Shores, Calif.) configured to respond to SQL queries. Database server 205C may be configured to store and provide access to information related to a user of user computer 203, one or more recipients of an email message, and/or information regarding one or more custom email messages (e.g., a message customized through an editor interface).

According to one embodiment, schedule server 205D may be configured to schedule transmission of completed email messages. For example, after a user of user computer 203 customizes an email message, the user may identify a plurality of recipients for the custom email message (e.g., a user of recipient computer 207). Schedule server 205D may schedule a transmission of a plurality of custom email messages to the plurality of recipients. Because a large number of email messages may be transmitted, schedule server 205D may perform load balancing operations (such as spreading the transmission over a period of times) so that the transmission of email messages is distributed according to available resources.

According to one embodiment, mail farm servers 205E may be configured to transmit custom email messages to a plurality of recipients. Mail farm servers 205E, for example, may retrieve an email message and a list of recipients from database server 205C according to an instruction from schedule server 205D and transmit an email message to each recipient identified by the list of recipients. Mail farm servers 205E may be configured to execute a well known Simple Mail Transmission Protocol process (SMTP) that performs mail transmission to remote computer systems. The email messages may be transmitted through firewall 213 and the Internet 209 to a recipient using recipient computer 207.

According to one embodiment, email messages transmitted to a recipient may be received by the recipient's internet service provider (ISP) mail server 205F. In some implementations, ISP mail server 205F may store a representation of the email message until the recipient (e.g., using an email client executed by recipient computer 207) retrieves the email message. In some embodiments, ISP mail server 205F may perform spam filtering and/or authentication of a transmitter of an email before allowing an email message to be transmitted to a recipient and may reject some email messages that fail such filtering or authentication processes.

According to one embodiment, bounce server 205G may respond to email messages that are rejected by ISP mail server 205F or otherwise are not properly delivered to the recipient and are returned (i.e., "bounced"). For example, bounce server 205G may be configured to record information regarding the rejection of the email message and to re-transmit the rejected email message a predetermined number of times. In some implementations, bounce server 205G, may include one or more servers substantially similar to mail farm servers 205E and/or may use mail farm servers 205E to perform some mailing functions.

According to one embodiment, domain name system (DNS) authentication server 205H may perform authentication for recipient ISP mail servers that require a DNS authentication before allowing an email message to be transmitted to a recipient. For example, ISP mail server 205F may transmit a request to authentic a domain name of the transmitter of the email messages. In some implementations ISP mail server 205F may use the well-known sender policy framework process to authenticate a sender by performing a DNS query. DNS authentication server 205H may receive the request and provide ISP mail server 205F with authentication, which may include a list of authorized sender domains. In some implementations, DNS authentication server may include a well-known DNS server coupled to LAN 211 and/or the Internet 209.

Subscriber server 205I and tracking server 205J may provide services related to a recipient of an email message. For example, subscriber server 205I may allow a recipient to subscribe and/or unsubscribe from a recipient list and may store such information in database sever 205C. As another example, click tracking server 205J may track and record whether a recipient opens an email message and/or selects any links within the email message. These functions and servers are examples only. In various embodiments, any desired set of services may be performed by any desired set of recipient related servers.

Although separate computer processes and systems communicating with one another have been described, it should be understood that embodiments of the instant invention are not limited to any particular arrangements of computer processes or systems. In some embodiments different process acts may be performed in addition and/or as an alternative to the described acts. In some implementations, computer systems described as separate may be a single computer system. In some implementations, a computer system described as a single computer system may be multiple computer systems.

Example Process and Interfaces

Figure 3:
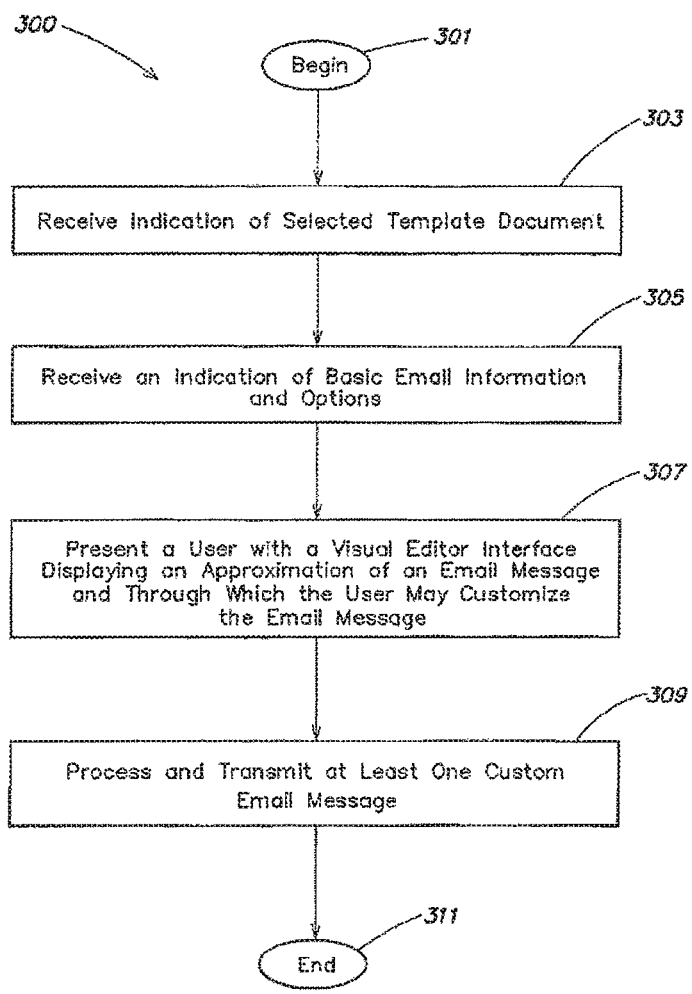
FIG. 3 shows an example process that may be performed by an embodiment of the instant invention.

FIG. 3 shows an example process 300 that begins at block 301 and that may be performed to create and distribute an email message according to some embodiments of the instant invention. It should be understood that process 300 is shown as an example only and that various embodiments of the instant invention may perform any set of acts in any desired order to create and distribute email messages.

Figure 4:
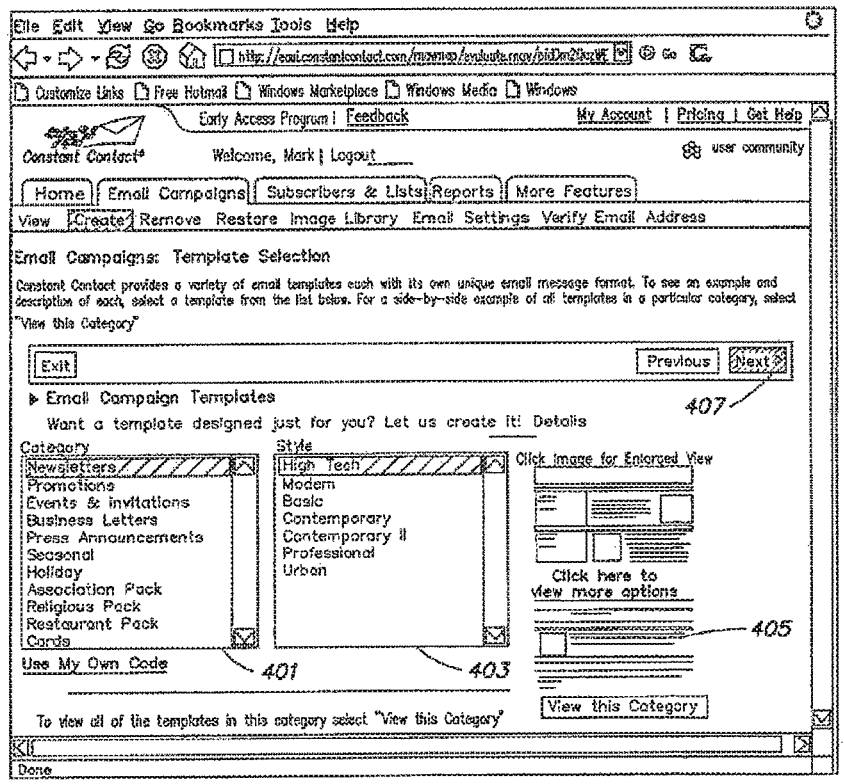
FIG. 4 shows an example template selection interface that may be used in an embodiment of the instant invention.

As indicated at block 303, process 300 may include receiving an indication of a selected template document. A template document may include any data indicating an initial set of content and/or layout of an email message. To facilitate selection of a template document by a user of an embodiment of the instant invention, a template selection interface may be provided to the user (e.g., by user interfaces system 201). FIG. 4 shows an example template selection interface that may be used to select a template document from a plurality of template documents.

In some embodiments, a template document may include information from which an initial representation of an email message may be generated. Templates may be used by some implementations because they may ease the process of designing an email message. For example, templates may be designed by professional email designers to include elements, layouts and formats that may be easily customized for particular needs.

In some implementations, the initial representation of the email message may include a plurality of content blocks positioned according to an initial layout defined by the template document. In some implementations, a template document may also include information that may be used to customize one or more controls of an editor interface. Such customization of controls may allow an email message based on a template document to be edited with a set of controls most optimized for the base template document. In conventional email editing techniques, templates have been used (e.g., as a base for a document and/or wizard), however, templates have only been used with a standard set of controls rater than to customize such controls.

In some embodiments, a template document may include an XML document. The XML document may define an email message that includes a plurality of panels and blocks. In some implementations, the panel and blocks defined in the XML document may be used to generate panel and block objects/wrappers in a JavaScript or other program. As described in more detail below, a panel may identify a relative position within an email message and any other desired characteristics associated with blocks within that position. As described in more detail below, a block may identify content such as text and images as well as formatting of the content and any other desired characteristics of the content. In some implementations, a panel of an email message may each include a number (e.g., 0 or more) blocks.

In some implementations, an initial representation of an email message may be generated based on a template document by generating the initial representation having the content of a plurality of blocks defined in the template document and the layout of a plurality of panels defined in the template document. Accordingly, the template document may define an initial layout and content of an email message by defining a plurality of panels and blocks within those panels.

In some implementations, a template document (e.g., in the form of an XML document) may define a DOM. A DOM, for example, may represent a webpage viewable by a standard web browser, as is known in the art. A representation of the DOM (e.g., the XML document itself, a tree structure defined by the XML document) may be use as input to a renderer (e.g., a renderer process executed by user interface system 201). In some implementations, the representation of the DOM may include some or all of the basic information and options of an email message, as described below with regard to process block 305. The renderer may generate an output HTML, text, or other formatted output based on the DOM and the configuration of the renderer. For example, in one implementation, a visual editor renderer may generate, at least in part, an HTML representation of an email message based, at least in part, on an input representation of a DOM.

In some implementations, renderer input may not be limited to a DOM based on a template document. For example, the DOM input may include, for example, a DOM defined by a template document or a DOM defined by a custom email message, such as an email message that has previously been partially designed using an editor interface and saved by a user for future customization.

In some implementations, a visual editor renderer may accept an input DOM that includes a plurality of panels and blocks. In this case, a visual editor renderer may add/or JavaScript and/or other programming elements to add content and layout functionality to the DOM. A visual editor renderer may then output at least a portion of a viewable webpage that may be transmitted to a user. Operation of various example renderers is described in more detail below.

FIG. 4 shows an example template selection interface according to one embodiment of the instant invention. As shown in FIG. 4, template documents may be categorized into a broad set of categories listed in a category list 401 and a subset of styles listed in a style list 403. A user may select a template category from the category list 401 and a style from the style list 403. In some implementations, a preview image 405 of a selected template document may be displayed through the interface to provide the user with an example of an email generated using the template document before the user selects a template document. When the user decides on a particular template, the user may select the next control 407 or other control type to submit an indication of the selected template document.

In some embodiments of the instant invention, user interface system 201 may receive an indication of the selected template document from the user (e.g., from user computer 203) through a communication network such as the Internet 209. In some implementations, the indication of the selected template document may include an electronic message, such as an HTTP message. In some implementations, the indication of the selected template document may include, for example, a template identification number referencing a database table of template documents, a position in category list 401 and style list 403 that may be used to identify the selected template document, and/or any other identifier that may be used to identify a selected template document.

In some implementations, rather than a template document, a saved custom email message may be selected and treated substantially similar to a template document. In this case, a user may access previously edited email messages through a saved email interface rather than a template selection interface so that new messages may be generated based on the previously edited email message or the previously edited email message may be further customized.

As indicated at block 305, process 300 may include receiving an indication of basic information and options for an email message. In some implementations, the basic information may include, for example, a subject of the email, a name of a sender of the email, an email address of a sender of the email address, a reply email address, and/or other email header information. In some implementations one or more optional elements, such as forwarding elements (e.g., a content element that includes a link to forward an email message to another email address), permission reminder elements (e.g., elements tat remind a recipient why they have received an email message and ask them to add a sender to an approved sender list such as an email contact list), and subscription elements (e.g., elements that include a link to add and/or remove a recipient from a recipient list).

Figure 5:
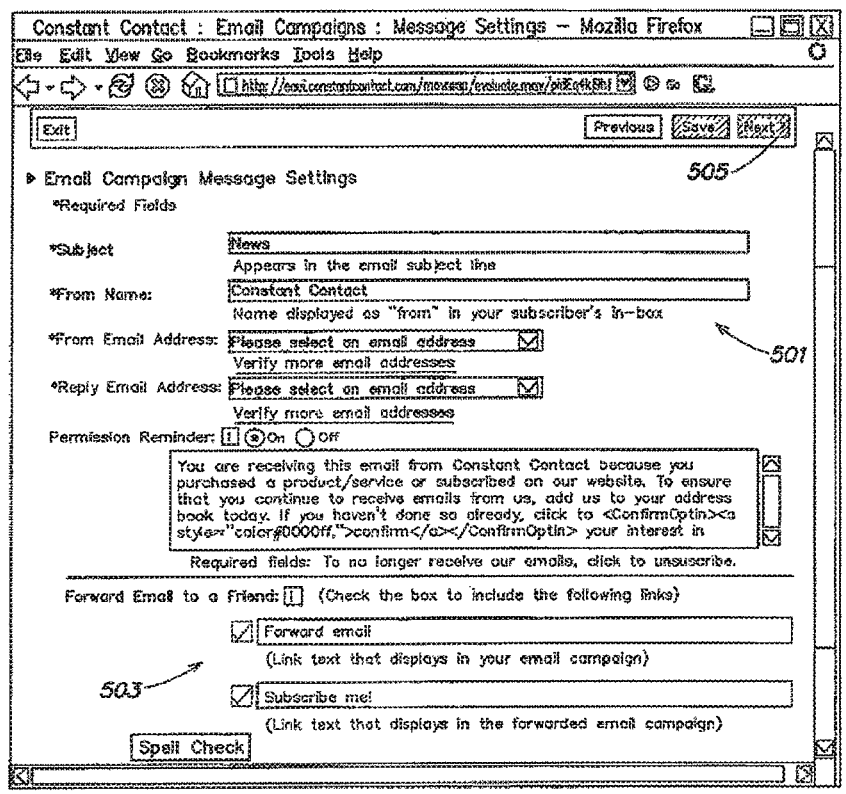
FIG. 5 shows an example information submission interface that may be used in an embodiment of the instant invention.

FIG. 5 shows an example interface that may be used by a user of an example embodiment to submit such basic information and options. A user, for example, may enter information into information blocks 501. A user may select one or more options using option selectors 503. When a user is satisfied with entered information and selected options, the user may select next control 505 to submit an indication of the basic information and options to an embodiment of the instant invention (e.g., user interface system 201).

In one example implementation, a system may receive the indication of the basic information and options from the user through a communication network such as the Internet 209. In some implementations, the indication of the basic information and options may be included within one or more electronic messages, such as an HTTP message.

As indicated in block 307, process 300 may include presenting a user with an editor interface. In some implementations, the editor interface may include an AJAX based webpage. However, it should be appreciated that other interface programming techniques may be used. The editor interface may initially display an initial approximation of an email message comprising a plurality of content blocks. In some implementations, the initial approximation of the email message may be generated based, at least in part, on a selected template document, as described above. In some implementations, the initial approximation of the email message may also be based on entered basic information and options. In the case of an initial approximation being based off of a template document and/or other basic information and options, a user may be presented with a base from which customizations may be made.

Figure 6:
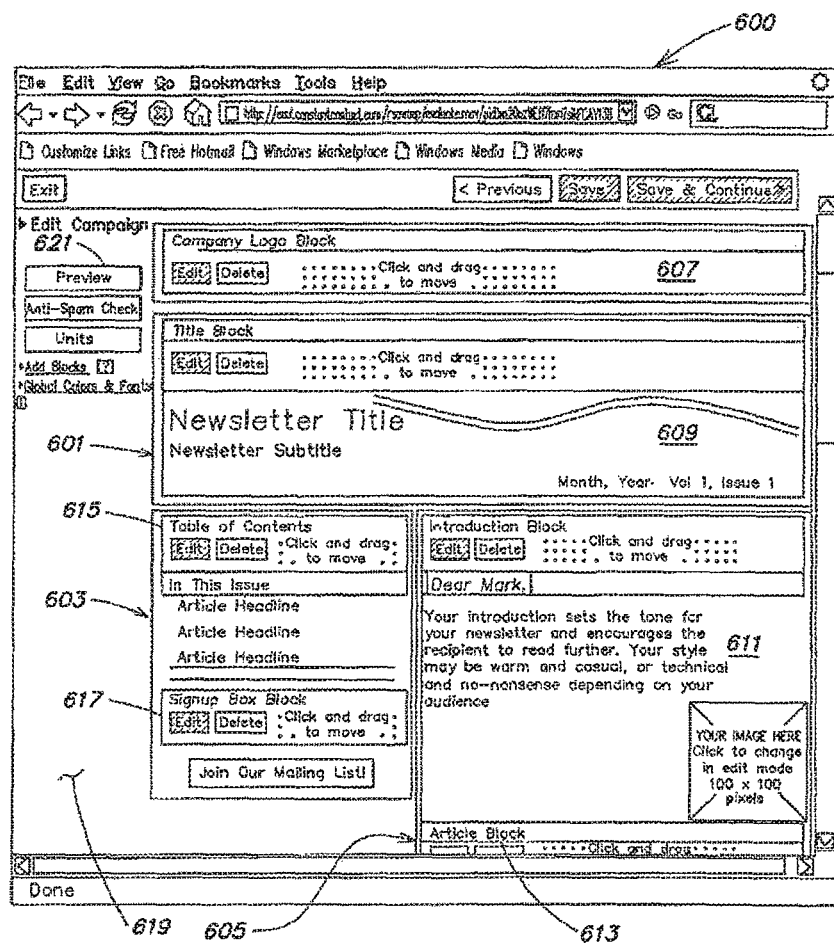
FIG. 6 shows an example editor interface that may be used in an embodiment of the instant invention.

In some embodiments, the editor interface may accept customization to content and layout of the email message to generate a custom email message. This may allow a user to flexibly generate a custom email message. In some implementations, the editor interface may accept customizations while displaying an approximation of an email message. This may allow a user to more readily appreciate the effect of a customization. In some implementations, the editor interface may display, to the user, a customized approximation of the email message based on the entered customizations as the user enters the customizations so that a user may see an approximation of a final output email in approximately real time. FIG. 6 shows an example of an editor interface according to one embodiment of the instant invention.

In some embodiments, a visual editor may parse and replace elements of an editor interface based on an interface being used to access the visual editor by the user. For example, in some implementations a user may access the visual editor using a web browser. Because certain web browsers render HTML differently and support different technologies, an HTML-based editor interface may appear differently in different web browsers. In some implementations, a web browsers' rich edit controls are limited either in general functional or in browser specific ways; in these cases HTML re-writing may be employed to enhance the functionality of the Rich Edit Control or to more standardize the web browser behavior.

FIG. 6 shows an example editor interface 600 displaying a portion of an initial approximation of an email message (e.g., an email message before any customization) according to one embodiment of the instant invention. The email message may include a plurality of panel elements (e.g., 601, 603, and 605). As discussed above with respect to the template document, a panel element may define a position within an email message. For example, header panel 601 defines an area at the top of the email that spans the width of the email message, left column panel 603 defines an area below the header panel on the left side of the email address spanning about a third of the email, and top panel 605 defines an area below the header panel on the right side of the email and spanning about the remaining two-thirds of the email message.

In one example implementation, the position of a panel may be defined by the order in which the panels are defined in the selected template document or later in a DOM associated with an email message. For example, a template document corresponding to the example template email of FIG. 6 may include a table definition that defines a table element having a width of 580 pixels (i.e., the width of the email message). The template document may next include a definition of header panel 601 having a width of 580 pixels as well. The template document may next include a definition of left column panel 603 having a width of 185 pixels. The template document may next include a definition of top panel 605 having a width of 380 pixels. In this example, a header panel 601 may be placed at top of the template email message because the associate definition appears first in the template document. Next, left column panel 603 may be position top and left with a width that only spans part of the email message. And then top panel 605 may be positioned in the remaining space to the right of left column panel 603 because the width of top panel 605 is less than the remaining width of the email message. It should be understood that the pixel values given above are described as an example only.

In one example implementation, each panel may be defined by XML code that corresponds to a portion of an AJAX based webpage. Left column panel 603 shown in the template email of FIG. 6 may be defined, for example, in a selected template document as:

```
<tr>
  <panel title="Left Column">
    <td valign="top" width="185" class="QuicklinkBG">
    </td>
  </panel>
</tr>
```

In this example definition, left column panel 603 is empty (e.g., contains no block elements), is defined to have a width of 185 pixels, is defined so that content within the panel is aligned to the top of the panel, and is defined to use cascading style sheet class "QuicklinkBG" which may be defined elsewhere in the template document.

As shown in FIG. 6, a representation of an email message in editor interface 600 may also include a plurality of content blocks 607, 609, 611, 613, 615, and 617. Each block may include a type defined in the template document selected by the user at block 303 of process 300. For example, block 607 includes a company logo block, block 609 includes a title block, block 611 includes an introduction block, block 613 includes an article block, block 615 includes a table of contents bock, and block 617 includes a signup box block. Contents and characteristics of each block may also initially be defined by the template document and/or the basic information and options received at block 305 of process 300.

Similar to a panel as described above, each block may be defined by XML code that may correspond to a portion of an AJAX based webpage. An example definition of table of contents block 611 within left column panel is given by:

```
<tr>
  <panel title="Left Column">
    <td valign="top" width="185" class="QuicklinkBG">
      <block title="Table of Contents" type="toc">
        <table cellpadding="5" cellspacing="0" border="0"
          width="100%"
          class="BlockMargin">
          <tr>
            <td height="20" class="Title TitlePadding TOCTitle">
            <b><heading>In This
            Issue</heading></b></td>
          </tr>
          <toc>
            <tr>
              <td width="100%"><a class="TOCLinks" href="">Article
              Headline</a></td>
            </tr>
          </toc>
        </table>
      </block>
    </td>
  </panel>
```

In this example, table of contents block 611 is defined to be within left column panel 603. Table of contents block 611 is defined to use cascading style sheet classes "BlockMargin," "Title," "TitlePadding," "TOCTitle," and "TOCLinks," which may be defined elsewhere in the selected template document. Such cascading style sheet classes may define available and/or default font and\or background characteristics (e.g., color, style, etc.) for the block. Table of contents block 611 is defined to include contents including a title with text of "In this Issue," and a table of contents element defined within the <toc> and </toc> tags which displays headlines of other blocks that are defined having a "toc" flag set to "true." For example, an article block with a "toc" flag set to "true" may be defined, in part, as:

<block title="Article Block" toc="true">.

In some implementations, an email message may be limited to a single table of contents element and/or block. In some implementations, a table of contents bar may include a refresh control that may be selected to refresh the table of contents list (e.g., determine if changes have been made to an <toc> tags and adjust a list accordingly).

In some implementations, additional special flags other than the "toc" flag may be included in some block definitions to identify special functionality associated with a block. For example, in some implementations, some blocks may incorporate partner incorporated information. In some implementations, such blocks may include a special promotions flag to identify that the block information may reference an outside source. In some implementations, such information may be used by one or more renderers in generating a representation of the email message. For example, the renderers may search for such special flags and perform a designated function in some modes. Particularly, with respect to the promotions tag, a preview renderer when generating a live version of an email message may merge partner information into a promotions block.

In some implementations, multiple blocks may be positioned within a single panel. For example, table of contents block 611 and signup box block 613 are positioned with left column panel 603 in the example representation of an email message in FIG. 6. Similar to the position of panels within an email message, as described above, the order of blocks within a panel may be determined, in some implementations, by the order the blocks are defined within the panels (e.g., in a template document or a DOM).

In addition to the initial approximation of the email message, editor interface 600 includes a control panel 619. Control panel 619 may include global and/or block specific functionality such as text formatting, content addition, block addition, anti-spam checking, undo, redo, spell checking, and/or preview operations. Control panel 619 may include different control elements based on an edit operation/mode (e.g., by requesting an update to control panel 619 based on user input by transmitting an XMLHTTP request to user interface system 201). In some implementations, as is described in more detail below, control elements included in control panel 619 may be based, at least in part, on the selected template document.

Through the editor interface 600 as shown in FIG. 6, a user may customize content and layout of a displayed email message. Various customizations may be performed and/or stored at different process levels within the computer systems associated with editor interface 600. These process levels may be arranged to provide a balance between speed of operations (e.g., spell check) and reliable persistence of data (e.g., storing content changes to a database).

For example, in one embodiment, customization may be divided into three process levels: a client level, a sever level, and a database level. The client level may include a process performed on a user's computer system (e.g., through one or more programs, such as JavaScript programs, executed on user computer 203). The server level may include communication between the user computer 203 and user interface system 201 so that user interface system 201 may track customization of the email message (e.g., by storing information in local memory that is faster than memory of a larger database server such as database server 205C). The database level may include a persistent storage and/or retrieval of information to and/or from at least one database table (e.g., stored on database system 205C). Although an example of arranging actions among these levels is described below, any desired arrangement among these levels or arrangement of alternative or additional process levels may be used with embodiments of the instant invention.

In some implementations, retrieval of a template document or otherwise saved representations of an email message (e.g., from previously edited email messages) to display a representation of a template email may include a database level process. For example, in some implementations, the template document may be retrieved from a database server, by performing a database query.

In some implementations, at least a portion of the functionality of editor interface 600 (e.g., customization of content, customization of layout) may be enabled by a plurality of JavaScript programs hooked to specific events (e.g., mouse clicks on controls such as add controls or control panel 619 elements, mouse drags such as drags of a block or right clicking on an image, etc.). It should be understood that any events in addition to the customization events described below may include hooked JavaScript events. It should also be understood that the instant invention is not limited to a visual editor implemented using hooked JavaScript events.

In some implementations of editor interface 600, a user may perform layout customization of an email massage, such as adding, deleting, and/or moving blocks among panels through editor interface 600. As the blocks are added, deleted and or moved, a displayed representation of the email may be updated to display a new approximation of the email message.

Figure 7:
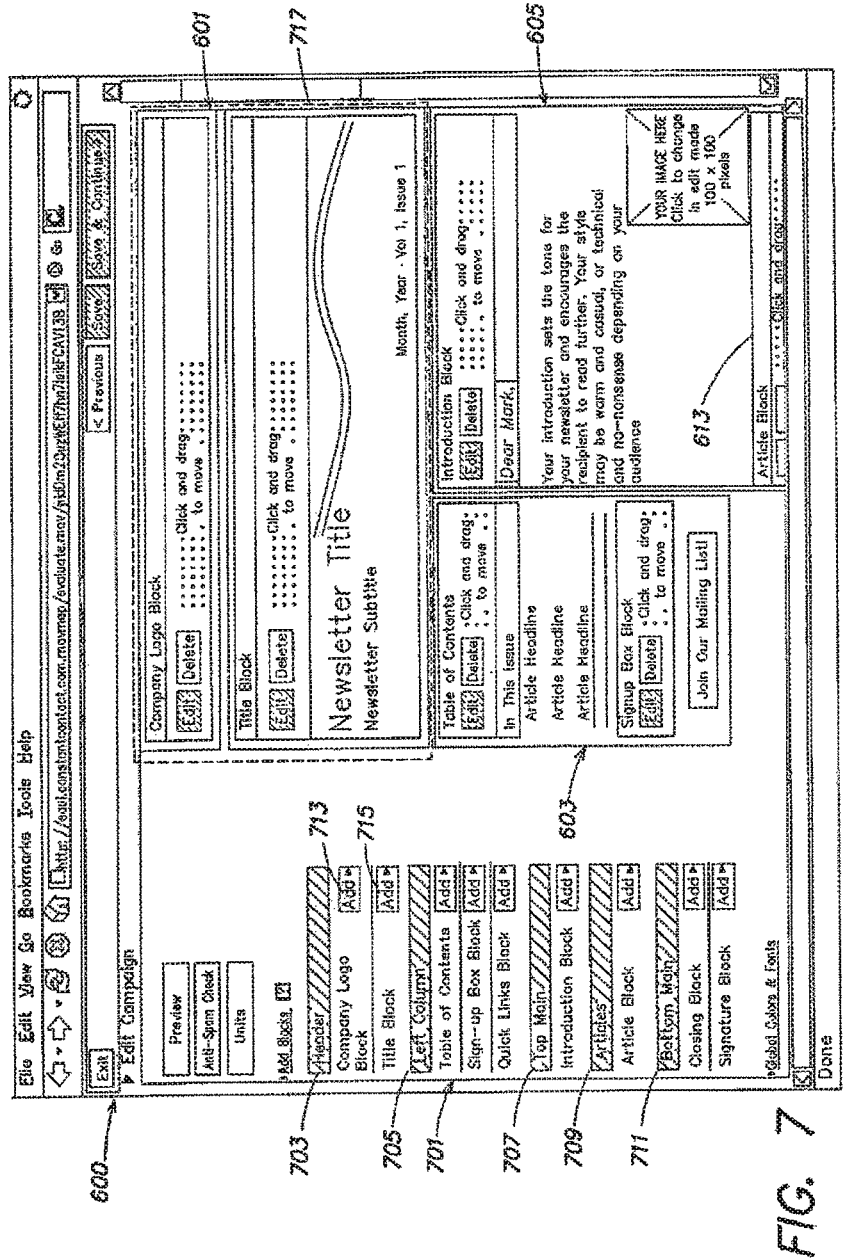
FIG. 7 shows an example block adding interface that may be used in an embodiment of the instant invention.

FIG. 7 shows an example block adding interface 701 that may be used to add one or more blocks through editor interface 600. An "Add Blocks" link of control panel 619 may be selected to access block adding interface 701 through which a user may add a block at the end of a panel.

Controls available through block adding interface 701 may, in some implementations, be defined, at least in part, by a selected template document. For example, block adding interface 701 includes header interface 703, left column interface 705, top main interface 707, articles interface 709, and bottom main interface 711. In some implementations, each of these interfaces may correspond to a panel defined in a selected template document. For instance, header interface 703 may correspond to header panel 601.

As is shown in FIG. 7, the types of blocks that may be added to each panel may be limited. In some implementations, blocks that may be added to each panel may be defined, at least in part, by a selected template document. In some implementations, a panel interface (e.g., 703, 705, 707, 709, and 711) may include block add controls for each block originally positioned within an associated panel in a selected template document. For example, header interface 703 includes a company logo block add control 713 and a title block add control 715. A selected template document corresponding to the email message may include a header panel 601 having a company logo block 607 and a title block 609 corresponding to add controls 713 and 715. In some implementations, a panel interface (e.g., 703, 705, 707, 709, and 711) may only include add controls for "cloneable" blocks positioned within an associated panel in a selected template document. A cloneable block may include a block having a <clone> tag set to true (or not set to "false"). For example, with respect to the example article interface 709, an article block within an article panel may be defined in part as: <block title="Article Block" clone="true">, and with respect to top main interface 707, article block 613 within top main panel 605 may be defined as <block title="Article Block" clone="false">. In some implementations, a default value of the <clone> tag may be true, so that a block is cloneable unless the attribute is set to "false." In some implementations, the number of cloned copies of a block that may be added to an email message may be limited to a maximum number (e.g., 30).

In some implementations in which a template document includes multiple blocks of a single type in a panel, only one of the multiple blocks may have a <clone> tag set to true. Whenever a new block of that type is added to the panel, the block with the clone attribute set to true may be copied and added at the end of the desired panel.

In some implementations, an intermediate representation of a block and/or panel may be displayed to identify an approximate position where a block may be added. A panel may be identified to the user to aid in determining which block to add to which panel. For example, if a user positions a cursor within header interface 703, outline 717 may appear around header panel 601. In some implementations, outlining the panel may include a client level process.

A user may add a block into a panel by clinking the add control next to the block's name in block interface 701. The selected block may be added to the selected panel after the user selects the respective add control. The block added may be a copy of a cloneable block's defined by a selected template document (e.g., the block's contents may be the same as a block default content defined in the selected template document). In some implementations, the copied block may include a cloneable block of the desired type, as described above.

Adding a block, in some implementations may include a server level process. For example, adding a block may cause an entry to be added to a DOM stored by a web browser executing on the user's computer (e.g., adding a block node to a panel node of a DOM) and may cause a transmission to be made to user interface system 201. The transmission may include a representation of the updated DOM. In some implementations, the remote server may be configured to track the addition of a new block by storing the representation of the updated DOM in local memory (e.g., random access memory (RAM), hard disks, etc).

Some embodiments of a visual editor may allow a user to delete blocks. For example, in editor interface 600, company logo block 607 may be deleted by selecting delete control 719. In some implementations, a delete control may include a familiar "X" close control used to close many traditional computer applications. In some implementations, a user may be warned and/or asked to confirm before a block is deleted. Deleting a block, in some implementations may include a server level process. For example, deleting a block may cause an entry to be deleted from a DOM stored by a web browser executing on the user's computer (e.g., deleting a block node of a panel node of a DOM) and may cause a transmission to be made to user interface system 201. The transmission may include a representation of the updated DOM. In some implementations, the remote server may be configured to track the addition of a new block by storing the representation of the updated DOM in a local memory.

In some implementations, a visual editor may allow a user to move a block from an initial position to a desired position (e.g., from one panel to another panel, from an initial position in a panel to desired position in the same panel).

Figure 8:
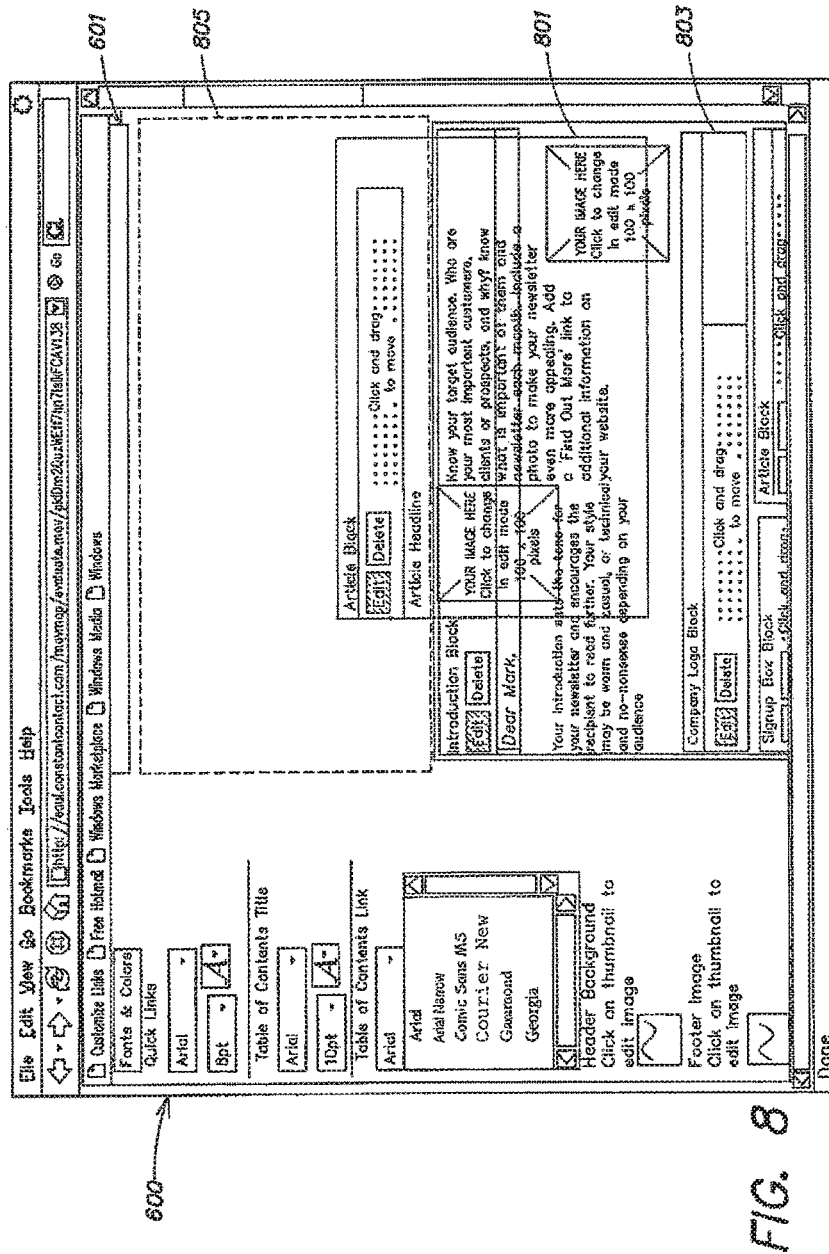
FIG. 8 shows an example editor interface in which a block is being moved according to an embodiment of the instant invention.

FIG. 8 shows editor interface 600 in which an article block 801 is being moved into header panel 601.

In some implementations, a block may be moved, for example by selecting and dragging a movement bar of the block. For example, FIG. 8 shows a company logo block movement bar 803. In some implementations, as shown in FIG. 8, a block is being dragged, the block is displayed in a partially transparent manner (e.g., article block 801). A position of article block 801 may correspond to a location of a cursor within editor interface 600.

In some implementations, a JavaScript program may monitor select and drag events and enable at least a portion of the movement functionality of editor interface 600. For example, in one implementation, each block in a representation of an email message displayed through editor interface 600 may include an HTML table wrapped by a JavaScript object enabling the movement functionality. In some implementations, for example, a JavaScript object may await a mouse down event at a particular location (e.g., on a movement bar of a block). When the mouse down event occurs, contents of a respective block may be copied to a drag item JavaScript object, which may include an HTML span element wrapped by JavaScript. The drag object may be sized to match the original block's size, a fade effect may be applied so that the drag object appears transparent, and the drag object may be moved along with a cursor movement. Furthermore, when the mouse down event occurs, the original block may be hidden so that it appears to be dragged from its original location along with a cursor.

In some implementations, an intermediate representation of a block move may be indicated to illustrate where a block may be positioned. For example, as shown in FIG. 8, as a block is being dragged, a location in which the block may be placed if the block is dropped at a current cursor position is indicated. Particularly, outline 805 indicates that article block 801 may be placed in the position of outline 805 if article block 801 is dropped in its current position. The outlined cursor position may, in some implementations, correspond to a position within a nearest panel to the cursor position (e.g., header panel 601).

In some implementations, a size of the indication (e.g., outline 805) of the new position may correspond to a size that the block being moved would be if dropped into the new position. For example, article block 801 may be approximately the size outline 805 the block is moved into the location indicated by outline 805. The size of the block in the new position may be different then in the block in the old position because the old position may include a panel of different proportions (e.g., top panel 605) that the new position (e.g., header panel 601). In some implementations, other blocks may be repositioned to approximate a new layout as the block is being moved.

In some implementations the indication functionality described above may be enabled using a normally hidden preview HTML table with dashed line border may be used to provide such position preview functionality. For example, after a mouse down event tracked by a drag item object, mouse movement may be monitored until a mouse up event. The normally hidden preview HTML table may continue to be repositioned along with mouse move events before such a mouse up event. On a mouse over event of another block within the email message, in some implementations, the normally hidden preview HTML table may be resized to match a block being moved, inserted and unhidden before or after the moused over block. Whether normally hidden preview HTML table is positioned before or after the moused over block may depend, for example, on a cursor position. For example, in some implementations, if the mouse over event occurs in a top half of a block, the normally hidden preview HTML table may be inserted before the moused over block, but if the mouse over event occurs in the bottom half of the block, the normally hidden preview HTML table may be inserted after the moused over block. Such functionality may provide the user with a movement experience that may be expected on traditional desktop applications rather than web-based applications.

In some implementations, when a user releases a mouse control after dragging a block to a desired position (e.g., drops the block in the desired position), the block may be placed in the desired panel in an order corresponding to the desired location. For example, on a mouse up event, a block being hidden, as discussed above (e.g., the original block that was the target of a mouse down event), may be deleted from an old position and inserted before a normally hidden preview HTML table block and then the normally hidden preview HTML table block may be hidden again.

In some implementations, movement of a block may correspond to a block node being removed from an old panel node of a DOM and added to the new panel node of the DOM or an order of block nodes of a single panel node being changed.

Figure 9:
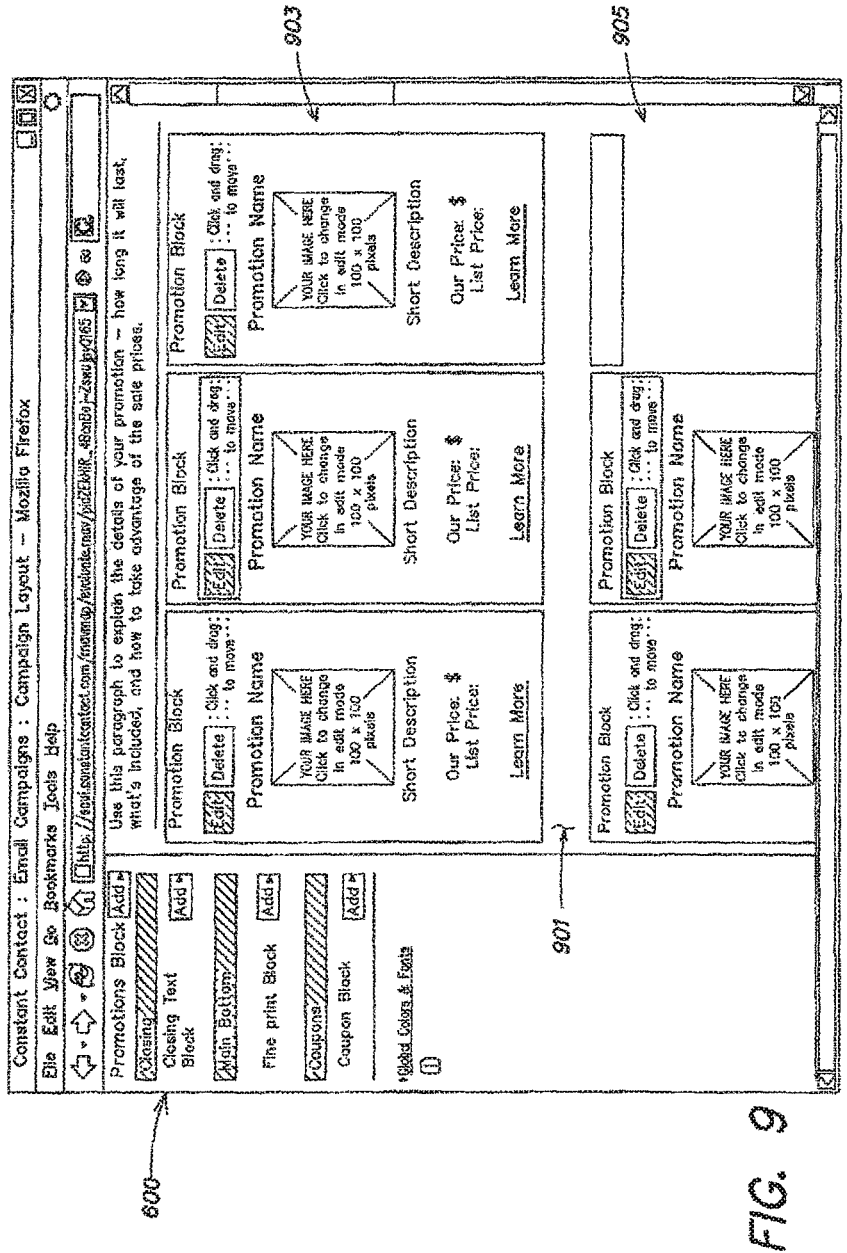
FIG. 9 shows an example editor interface displaying a horizontal wrapping functionality of an embodiment of the instant invention.

In some implementations, a panel may be configured to provide a wrapping functionality for blocks within the panel as blocks are added, deleted, and/or moved. For example, a promotions panel 901 shown in FIG. 9 contains three blocks horizontally across the panel in a first horizontal row 903 and two blocks across the panel in a second horizontal row 905. The blocks in this panel may be configured to wrap from first row 903 to second row 905 so that panel locations towards a top left location are filled first. Specifically, if a top right block is moved to a bottom middle location, the bottom left block may be moved to the top right location, and the bottom middle block may be moved to the bottle left location.

In some implementations, functionality associate with a block being moved (e.g., insertion of temporary blocks, display of partly transparent block) may include a client level process. The process may be performed, for example, by a JavaScript program executed by the user's computer.

In some implementations, placement of a block in a desired location may include a server level process. When the user places the block in the desired location, a document object model maintained by the client's web browser may be updated to reflect a new order and location of blocks within panels. The web browser may also transmit an indication of the updated layout to user interface system 201. User interface system 201 may store the information (e.g., a representation of an updated DOM) in a local memory.

Figure 10:
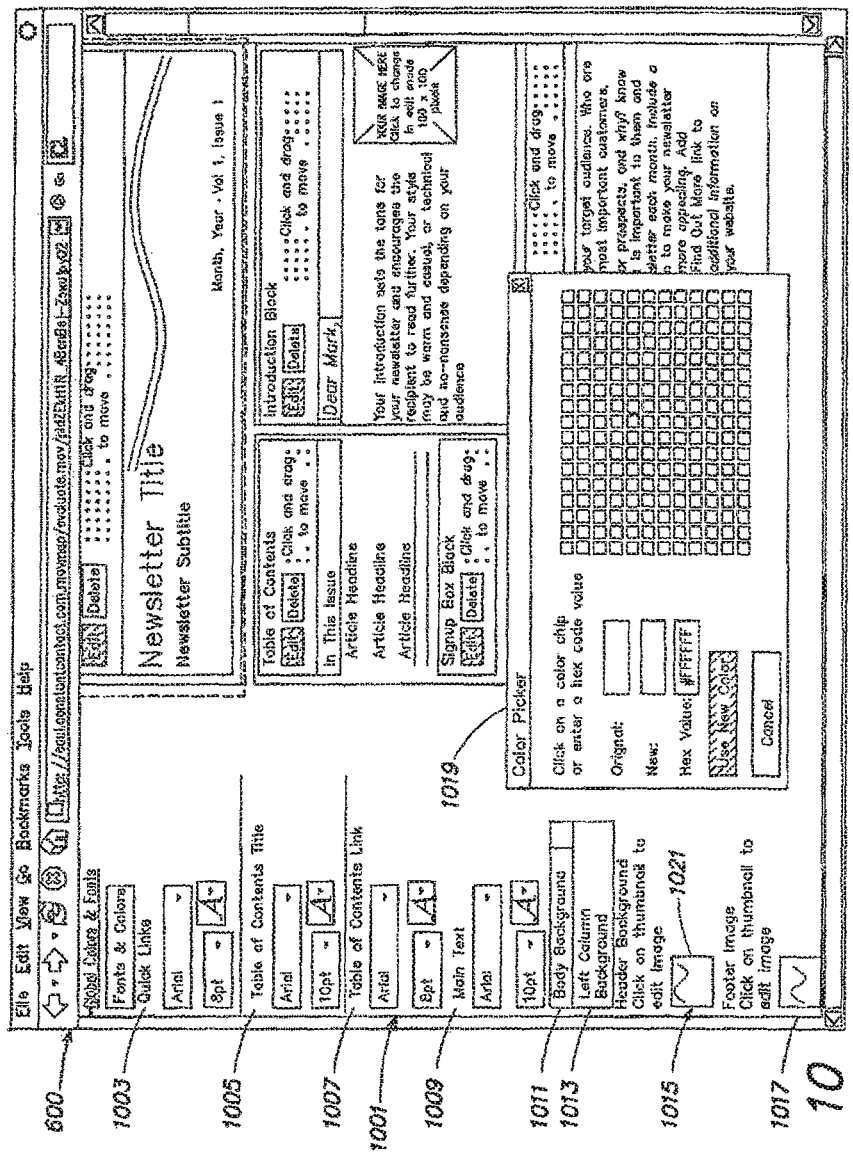
FIG. 10 shows an example editor interface in which a global editing functionality is displayed according to an embodiment of the instant invention.

In some embodiments, in addition to layout changes, a user may make global formatting changes through control panel 619. In some implementations, the global formatting changes may include textual format changes and/or graphical format changes. For example, a user may select on a "Global Colors & Fonts" link of control panel 619 to access a global formatting element 1001 as shown in FIG. 10. Similar to add block interface 701, in some implementations, access to global formatting interface 1001 may include a client level process that does not communicate to a remote server to display global formatting element 1001. By providing access to global formatting element 1001 as a client level process, such access may be provided quickly and seamlessly.

In some implementations, option available through global formatting element 1001 may be based, at least in part, on a selected template document. For example, in some implementations, the options available though global formatting element 1001 may correspond to cascading style sheet classes defined within the selected template document.

For example, global formatting element 1001 includes a quick links formatting interface 1003, a table of contents title formatting interface 1005, a table of contents links formatting interface 1007, a main text formatting interface 1009, a body background formatting interface 1011, a left column background formatting interface 1013, a header background formatting interface 1015, and a footer image formatting interface 1017. Each of these interfaces may correspond to a cascading style sheet class defined in the selected template document. Specifically, quick links formatting interface 1003 may correspond to a quick links class defined as:

```
.QuickLinks{
    title: Quick Links;
    font-family: Arial,Helvetica,sans-serif;
    font-size: xx-small;
    color: #333333;
    text-decoration: none;
}.
```

In some implementations, each cascading style sheet class included in a selected template document may have a corresponding formatting interface in global formatting element 1001. In some implementations, a class element, such as the title element included in the quick links class defined above, may act as a toggle for inclusion in global formatting element 1001. For example, any class having a title element may also have a corresponding interface in global formatting element 1001 and any class not having a title element may not have a corresponding interface in global formatting element 1001. Other elements may act as toggles in other implements so that desired controls may be included and un-desired controls may be excluded.

In some implementations, all elements of a defined class may be formattable through global formatting element 1001. In some implementations, only a subset of available elements may be formattable. For example, quick links formatting element 1003 only allows formatting of a font, a font size and a font color of the quick links class. Quick links formatting element 1003 does not allow formatting of a text-decoration element despite that element being present in the quick links class definition. In some implementations, a visual editor renderer may determine which elements are formattable and which are not formattable before providing editor interface 600 to the user and may generate an appropriate portion of webpage including editor interface 600.

In some implementations, individual class interfaces may allow different element editing based on the elements defined for a class. For example, the quick links class defines font style, font size, and font color, so those elements may be formattable. The body background class may define a color, so body background interface 1011 may include a color selector 1019 that may allow a user to select a new color for the body background class. Similarly, header background class may include an image, so header background interface 1015 may include an image selector 1021 that may allow a user to select a new image. In some implementations, an image selector 1021 may include a separate user interface (e.g., a separate webpage) through which a user may select a generic image or upload a custom image).

In some implementations, a global change made through global formatting element 1001 may affect any element of the email that is defined by a respective cascading style sheet class. For example, a change to the quick links class through quick links interface 1003 may affect all text associated with the quick links class.

In some implementations, making a global change through global formatting element 1001 may include a server level process. For example, a DOM node corresponding to a changed cascading style sheet class to be changed in a DOM stored by a web browser executing on the user's computer and may cause a transmission to be made to a remote server (e.g., user interface system 201). The transmission may include a representation of the updated DOM. In some implementations, the remote server may be configured to track the change to the cascading style sheet class by storing the representation of the updated DOM in a local memory.

In some implementations, global formatting element 1001 and/or control panel 619 may provide a user with one or more theme options (not shown). Such theme options may include, for example, changes to color schemes and/or style sheet classes of a particular email message being edited through editor interface 600. A user, for example, may select a theme element (not shown), such as a drop down box, to select a theme. The theme, for example, may include a set of colors (e.g., font colors, background colors, border colors, etc.) and/or a set of style sheet class definitions (e.g., new definitions for the already existing classes in a selected template document). A representation of the email message with the new colors and/or style sheet class may then be displayed to the user through editor interface 600. Theme functionality may include a server level process allowing tracking by user interface system 201.

In some implementations, control panel 619 may provide a user with undo functionality for layout and global formatting changes. For example, because a user may make mistakes, control panel 619 may include an "undo" control that may be selected to undo a previous block add, block delete, block move, and/or global formatting change. In some implementations, to provide such undo functionality, indications of operations (e.g., block moves) may be stored in a stack as the operations are performed. The stack may be stored by a program executed by a user computer (e.g., a JavaScript program, a web browser). The stack may be "popped" to determine an immediately previous operation when the user selects the "undo" control. Once the previous operation is determined, a reversal of the operation may be performed (e.g., returning a block to a previous position). In some implementations, a limited number of operations may be stored in a stack allowing only a limited number of operations to be undone. In some implementations, an undo function may include a process level similar to the undone operation.

Figure 11:
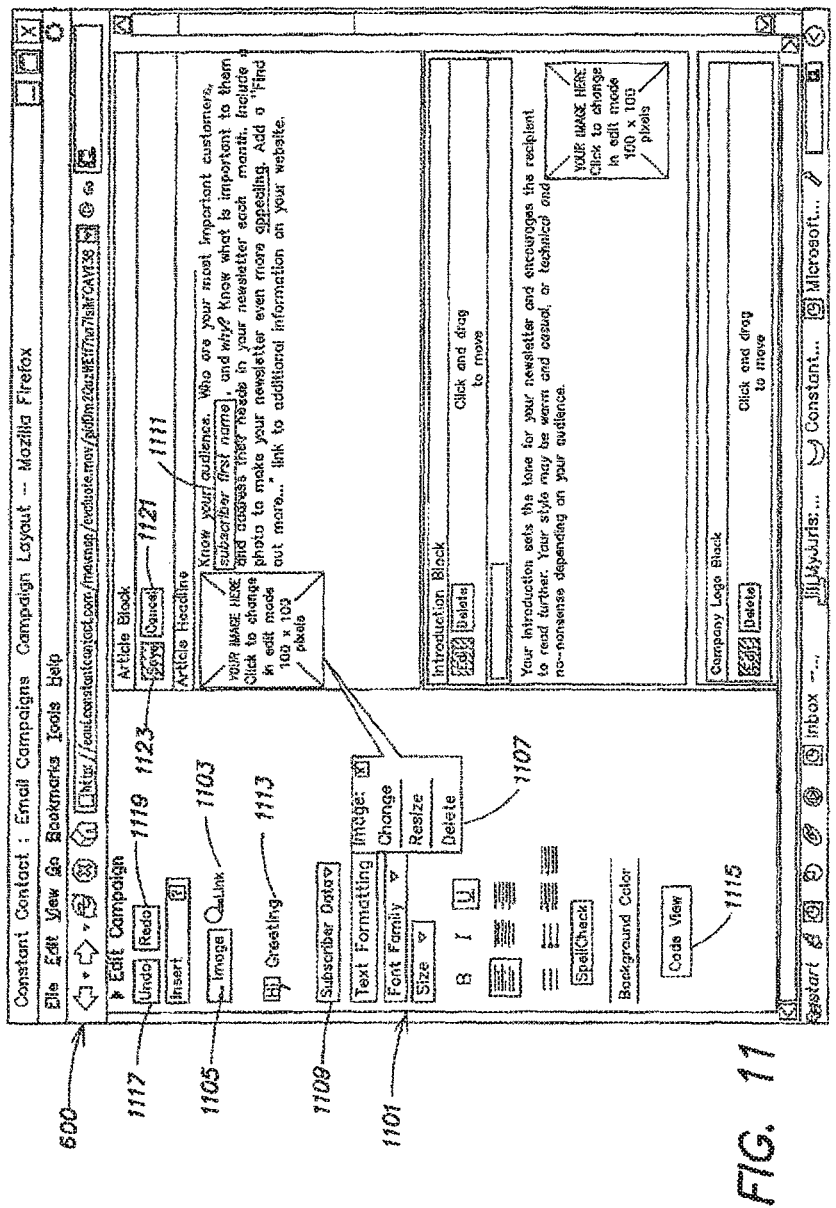
FIG. 11 shows an editor interface in which content of a block is being edited according to an embodiment of the instant invention.

In some embodiments, in addition to customization of layout and global formatting, as described above, a visual editor may allow a user to edit content of one or more blocks. FIG. 11 shows an example of content of article block 801 being edited through editor interface 600. A user, in some implementations may edit an individual block by selecting an edit control such as edit control 1023 shown in FIG. 10.

As shown in FIG. 11, in some embodiments, a user may customize content of a block. For example, a user may edit textual information, graphical information (e.g., images, backgrounds, colors), data-driven information, partner information, and/or link information.

In some implementations, to provide content editing functionality, a content editing interface may be provided to the user through editor interface 600. In some implementations, the content editing interface may include an HTML Iframe hidden from view of a user before the user selects an edit control of a block. When the user selects an edit control of a block, the Iframe may be resized and repositioned over the block and the contents of the block may be copied to the Iframe. The user may then perform edit content of the Iframe. When the user is finished editing the content of the Iframe, the content may be copied back to the block and the Iframe may be hidden once again.

In some implementations using cascading style sheet classes, copying the contents of a block may include converting cascading style sheet tags to inline style tags. Conversely, copying the contents of the Iframe to the block may include converting the inline style tags to cascading style sheet class tags. The cascading style sheet class tags may be converted to inline style tags to allow a user to alter individual attributes of a block because cascading style sheet tags take precedence over inline style tags in some web browsers. For example, if a block of text is attributed a class tag that defines a cascading style sheet class with a bold style and a sixteen point font and the same block of text is defined with an inline tag that identifies a twelve point font style, the sixteen point bold class tag may take precedence over the twelve point inline style tag even if the attribute tag is entered at a later time.

To overcome this potential conflict, some implementations may convert all cascading style sheet class tags to inline style tags. When a style is altered, the inline style tags may be changed to reflect the change. In some implementations, when the editing is complete and the user selects a save control, any changed inline tags may remain as inline tags since they may no longer correspond to a defined style class and any unchanged inline tag may be converted back to cascading style sheet class tags.

In some implementations, the conversion from class tags to inline tags and the display of the Iframe may include a client level process. These functions may be performed, for example, by a JavaScript program executed by the user's computer.

As shown in FIG. 11, when the Iframe is displayed, a user may type into the Iframe (e.g., article block 801) to edit text content. As a user types, changes to the text may appear in the edited block. In some implementations, a block may be limited to a maximum number of characters. For example, in one implementation, a block may be limited to a maximum of 15,000 characters.

In some implementations, when a user selects an edit control (e.g., 1023) control panel 619 may change to include a block interface 1101. Block interface 1101 may include options for changing a font style, size and color as well as formatting of a paragraph, editing a background color, and/or any other desired editing functions.

In some implementations, a user may also make formatting changes through the controls of block interface 1101. A user, for example, may highlight a target text and then select make a desired formatting change through block interface 1101. The target text may be changed to incorporate the desired formatting change.

In some implementations, a user may also insert one or more special content elements within a block using block interface 1101. For example, a user may insert an image, a hypertext link, and/or a data driven element through block interface 1101. In some implementations, a user may also insert a partner element.

Figure 12:
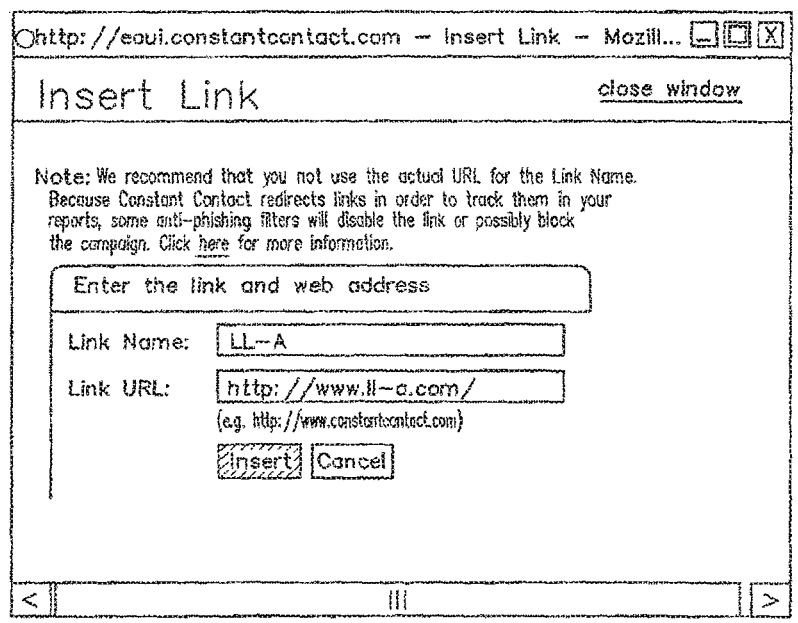
FIG. 12 shows an example link interface according to an embodiment of the instant invention.

In one implementation, selecting a link element 1103 may display a link interface (e.g., through a separate webpage). An example link interface is shown in FIG. 12. As shown, the link interface of FIG. 12 may allow a user to enter information regarding a link to be inserted. The information may include, for example, a link destination (e.g., a URL) and a link name (e.g., an identifier that may be displayed in the content of the block in place of the link).

In some implementations, when the user selects an "insert" control of a link interface such as the one in FIG. 12, the link may be inserted into the block (e.g., 801) being edited through editor interface 600. In some implementations, if the user entered the link interface by selecting link element 1103 with text highlighted, the highlighted text may become the name of the link. For example, the word "appealing" in block 801 of FIG. 11 comprises such a name of a link. In some implementations, a link universal resource locator (URL) and/or a link name may be limited to a maximum length. For example, in one implementation, a link name may be limited to 15,000 characters and a link URL may be limited to 510 characters. In some implementations, a link URL may be validated to follow a valid URL format before a link may be inserted into an email message.

Figure 13:
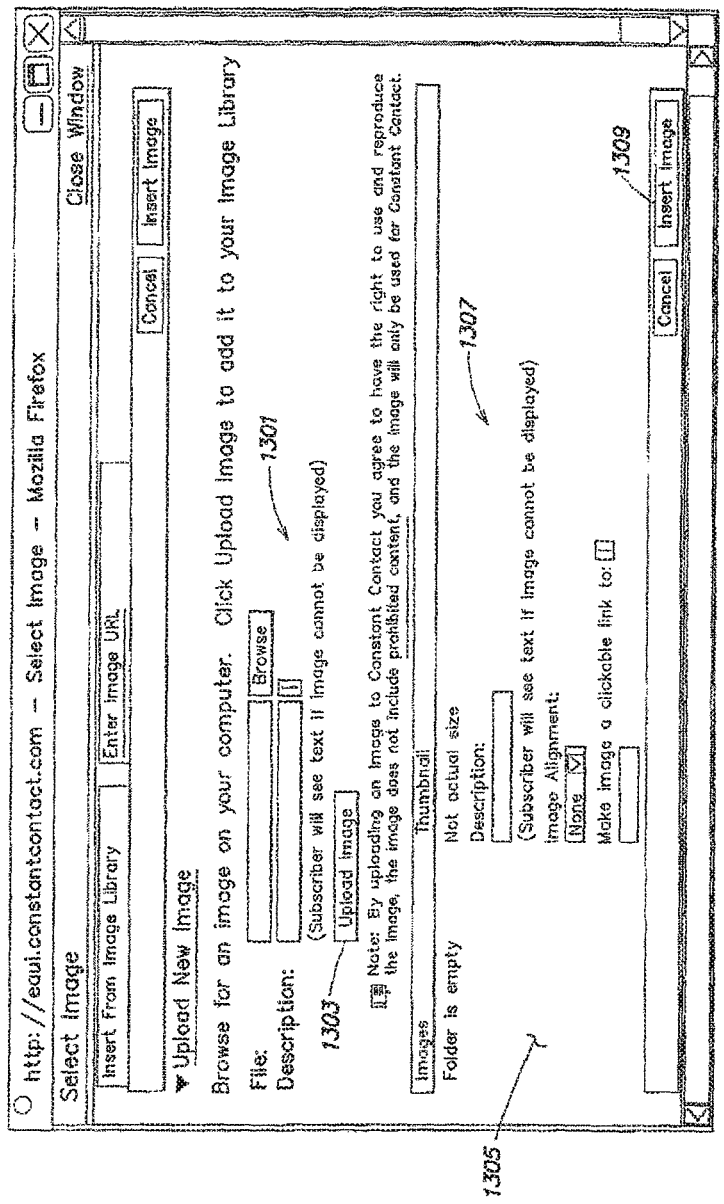
FIG. 13 shows an example image interface according to an embodiment of the instant invention.

In one implementation, selecting image element 1105 may bring up an image interface (e.g., in a new webpage) through which a user may upload an image to image server 205B and/or insert an image into the block being edited (e.g., block 801). FIG. 13 shows an example image interface. As shown, the image interface allows a user to enter a location and description of an image file through upload interface 1301 and to upload the image by selecting upload control 1303. An image interface may also allow a user to select from previously uploaded images through selection interface 1305, and enter formatting information, such as making the image link and entering image alignment details through image formatting interface 1307. A user may then insert an image at a cursor location within a block being edited (e.g., block 801) by selecting an insert control 1309. In some implementations, a similar image interface to the one shown in FIG. 13 may allow a user to enter a URL for an image rather than or in addition to a local image location as in the upload interface of FIG. 13.

In some implementations, a user may manipulate a previously inserted image of a block being edited (e.g., block 801). For example, in some implementations, a user may select and drag and image from one location within the lock to another location to move the image within the block. In some implementations, a user may right click and/or double click an image to access an image menu 1107 associated with the image.

Figure 14:
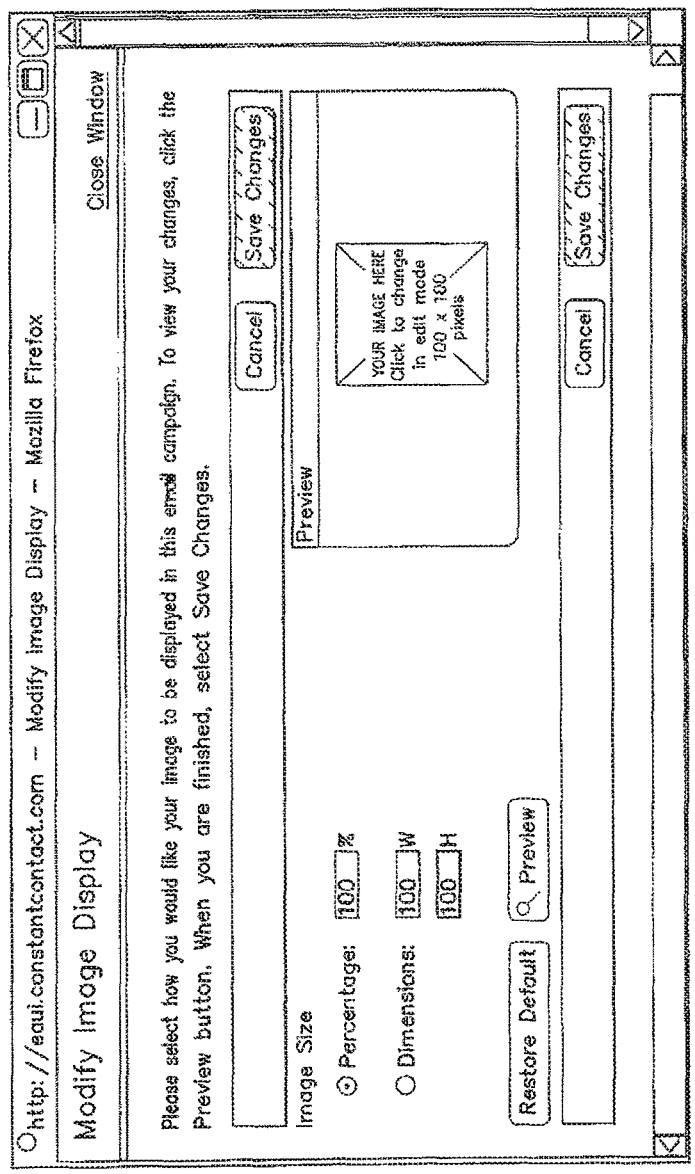
FIG. 14 shows an example resize interface according to an embodiment of the instant invention.

In some implementations, image menu 1107 may include a set of image manipulation options. For example, as shown in FIG. 11, image menu 1107 may include a change option, a resize option, and a delete option. In some implementations, a user may select a change option to access an image interface substantially similar to the one shown in FIG. 13. In some implementations, a user may select a delete option to remove an image from the block. In some implementations, even though an image may be removed from a block, the image may remain in an image library associated with the user and/or the email message and may be accessed (e.g., added) to another block (e.g., through the image interface shown in FIG. 13) at a later time without re-uploading the image. Selecting the resize option may display a resize interface (e.g., in another webpage) through which a user may adjust a size of the image. FIG. 14 shows an example resize interface through which a user may scale an image and adjust height and width dimensions directly as well as preview a resized image before finishing a resizing.

In some implementations, subscriber element 1109 may allow a user to insert data driven elements into a block being edited (e.g., block 801). For example, subscriber element 1109 may include a drop down list of stored subscriber information, such as first name, last name, email address, title, etc. Such data driven elements may be inserted into the block at a location of a cursor and may appear as a generic element during editing. For example, FIG. 11 shows a data driven element 1111 that references a recipient's first name. Before transmission of the email, each recipient's first name may be inserted into the data driven element 1111, for example by accessing a database that stores each recipients' first name and inserting the name in the place of data driven element 1111 in a respective copy of the email.

Figure 15:
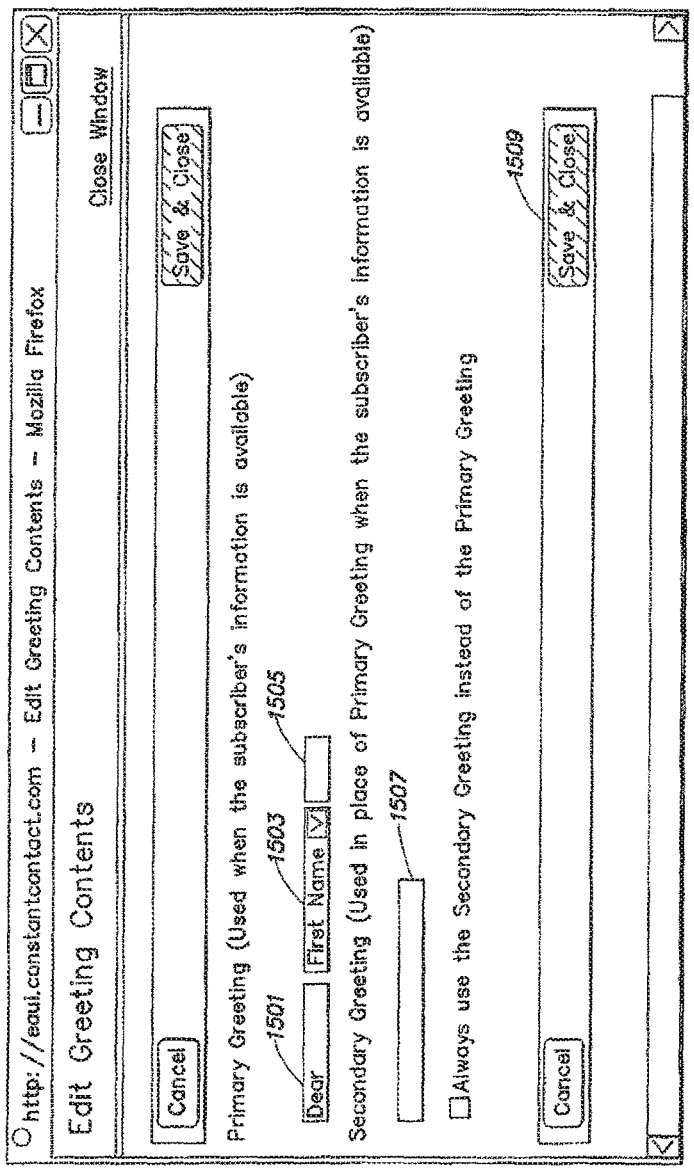
FIG. 15 shows an example greeting interface according to an embodiment of the instant invention.

In some implementations, a greeting element 1113 may allow a user to insert a custom greeting. For example, selecting greeting element 1113 may display a greeting interface. FIG. 15 shows an example greeting interface. As shown in FIG. 15, a greeting interface may allow a user to enter initial greeting text (e.g., though text box 1501), a data driven element (e.g., through data driven selector 1503) and an ending text (e.g., through text box 1505) for a primary greeting. A user may also enter a secondary greeting through secondary greeting element 1507. In some implementations, a secondary greeting may be used in place of a greeting if a data driven element selected through data driven selector 1503 is not available for a particular recipient. A user may insert a greeting object into a block by selecting a save control 1509.

In some implementations, a greeting object included in an email message may be partially read only. For example, a greeting object may be uneditable by selecting the greeting and typing into the greeting object. Rather, the greeting may only be editable through the greeting interface. This special treatment of greeting links may be useful to remind users that all data driven elements like those that typically appear in greetings (e.g., names) may not be available for all recipients of an email and that a secondary greeting may be useful. In some implementations, primary and secondary greetings may be merged with data driven elements/selected by a preview renderer generating live versions of a message to transmit to recipients at a later time.

In some implementations, a greeting interface may be accessed through a greeting menu by right clicking or double clicking a greeting object, similar to an image menu described above. In some implementations, a greeting menu may provide a user a set of options to manipulate a greeting. For example, in one implementation, a greeting menu may allow a user to delete greeting and to access a greeting interface such as the one shown in FIG. 15.

In some implementations, block interface 1101 may include a partner integration element (not shown). In some implementations, a user may access a partner integration element (e.g., a drop down menu, one or more buttons) to enable, disable, and/or edit partner integration within a particular block. In some implementations, partner integration may allow a user to include access to and/or information from a partner. A partner, in some implementations, may include a remote website that provides access to an API through which information and/or access to the website may be integrated into an email message. In some implementations, partners may include Amazon.com, PayPal.com, FTD.com, and/or any other desired website.

Figure 16:
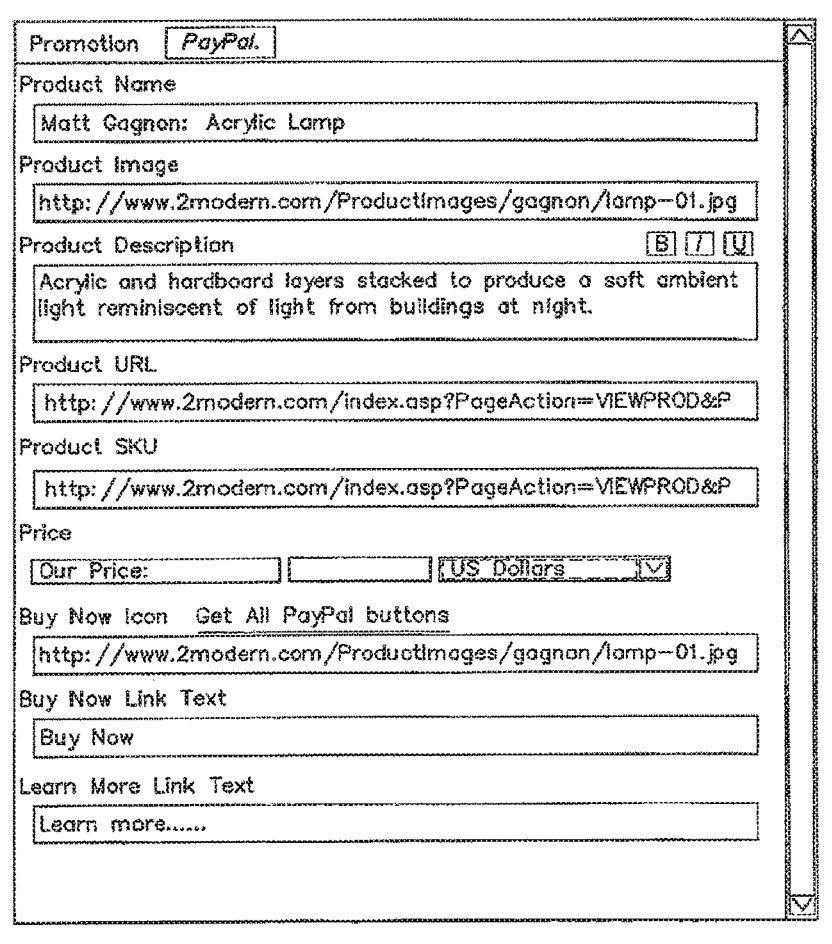
Figure 17:
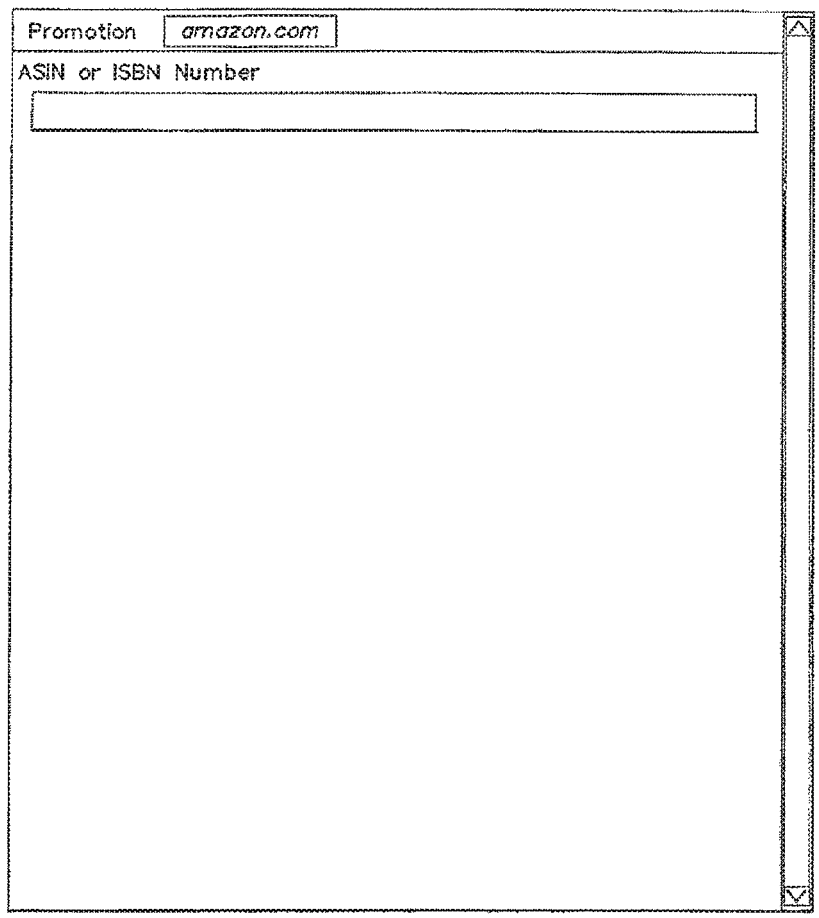
FIG. 17 shows an example partner integration interface according to an embodiment of the instant invention.

In some implementations, when a user selects a partner integration element, a partner integration interface may be displayed. In some implementations, a partner integration interface may be uniform for all partners. In some implementations, a partner integration interface may be different for different partners. FIGS. 16 and 17 show two example partner integration interfaces through which a user may enter/edit partner integration information to generate/edit a partner integration portion.

FIG. 16, for example shows a PayPal.com partner integration interface through which a user may enter information such as product name, product image URL, product description, product URL, product SKU, price, a buy now control URL, a buy now link text, and a learn more link text. In some implementations, a user may insert a partner integration portion integrating the entered information into a block being edited by completing the information and selecting an add control (not shown). In some implementations, through such an interface, a recipient of an email message may purchase an identified product by sending a PayPal.com payment to the user.

FIG. 17, for example shows an Amazon.com partner integration interface through which a user may enter a product Amazon standard identification number (ASIN)/international standard book number (ISBN). In some implementations, such a number identifies a product to Amazon.com and information such as product description, product images, buy now controls, product price, etc. may be integrated into a block being edited from Amazon.com.

In some implementations, before a user may include a partner integration portion into an email message (e.g., into a block), a user may be asked or required to enter information regarding membership with one or more partners. For example, before a user integrates a PayPal.com portion, the user may be asked to provide a PayPal.com identification (ID) email address and/or a completed payment URL identifying a PayPal.com account to which payments may be sent. Before integrating an Amazon.com portion, a user may be asked to provide an Amazon.com associate ID identifying that may be used to identify the user to Amazon.com. In some implementations, such membership information may be used for each partner integration portion for a respective partner in a particular email message. In other implementations, different membership information may be used for each partner integration portion even for the same partner within the same email message.

Figure 18:
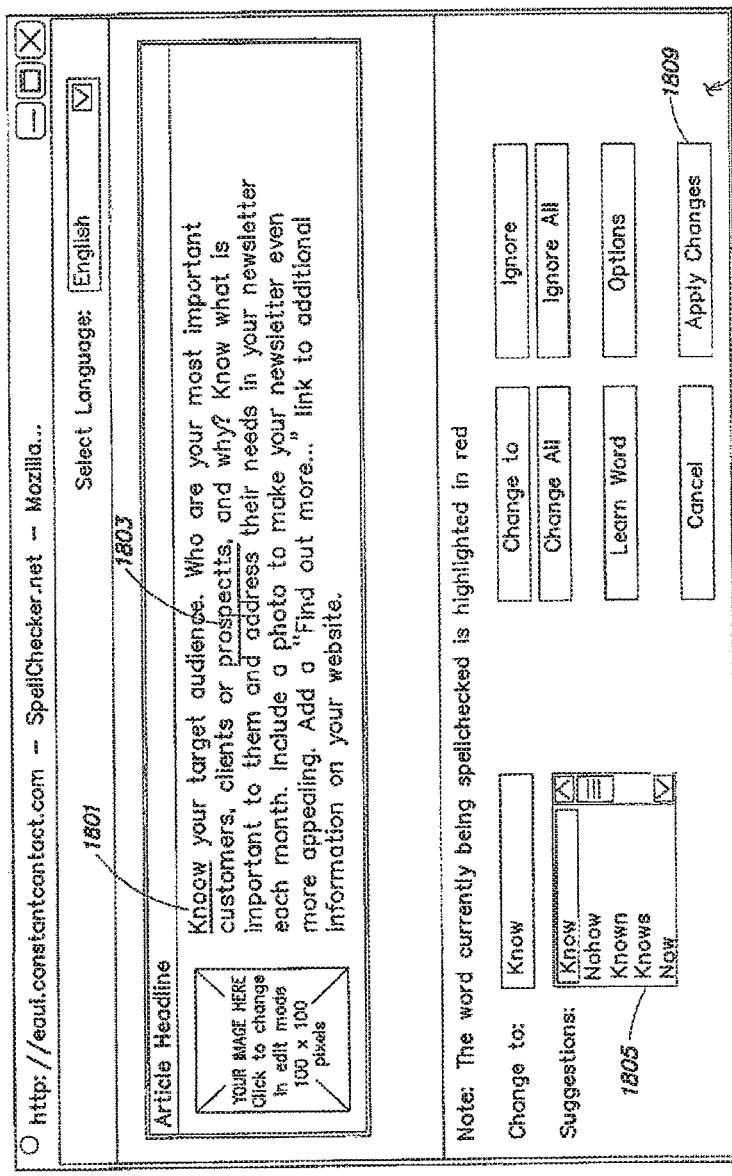
FIG. 18 shows an example spell check interface according to an embodiment of the instant invention.

In some embodiments, because users may misspell words, block interface 1101 may provide a user with a spell check option. For example, a user may access a spell check interface though block interface 1101 by selecting spell check control 1113. FIG. 18 shows an example spell check interface. As shown, in some implementations, a spell check interface may identify words that are not part of a library of known words (e.g., words 1801 and 1803) with an indication, such as an underline or highlight. In some implementations, a spell check interface may suggest words from a library of known words that are similar to the identified words through a suggestion interface 1805. In some implementations, a user may change an identified word to a suggested word, ignore an identified word, add an identified word to a library of known words, change an identified word to a non-suggested word, or cancel a spell check through a change interface 1807. In some implementations, change interface 1807 may cycle through identified words (i.e., unknown words) from a first to a last word suggesting alternative words.

In some implementations, spell check functionality may be provided by a spell check server 205A. In some implementations, for example, when a user selects a spell check control, a representation of textual content of a block being edited (e.g., block 801) may be transmitted to spell check server 205A. Spell check server 205A may perform a spell check process to identify unknown words and provide a user with a spell check interface such as the interface of FIG. 18 in a new webpage.

In some implementations, a user may apply changes made through the spell check interface by selecting apply control 1809. In some implementations, the changed textual contents of the spell check interface may be copied back to the block being edited (e.g., block 801) in editor interface 600 after the user selects apply control 1809.

In some implementations, a spell check may be performed using a tracked representation of an email message in memory of user interface server 201. By using such information to perform a spell check, the spell check may be performed more quickly than if a database query were performed to retrieve a stored representation of an email message from a database server (e.g., 205C).

Figure 19:
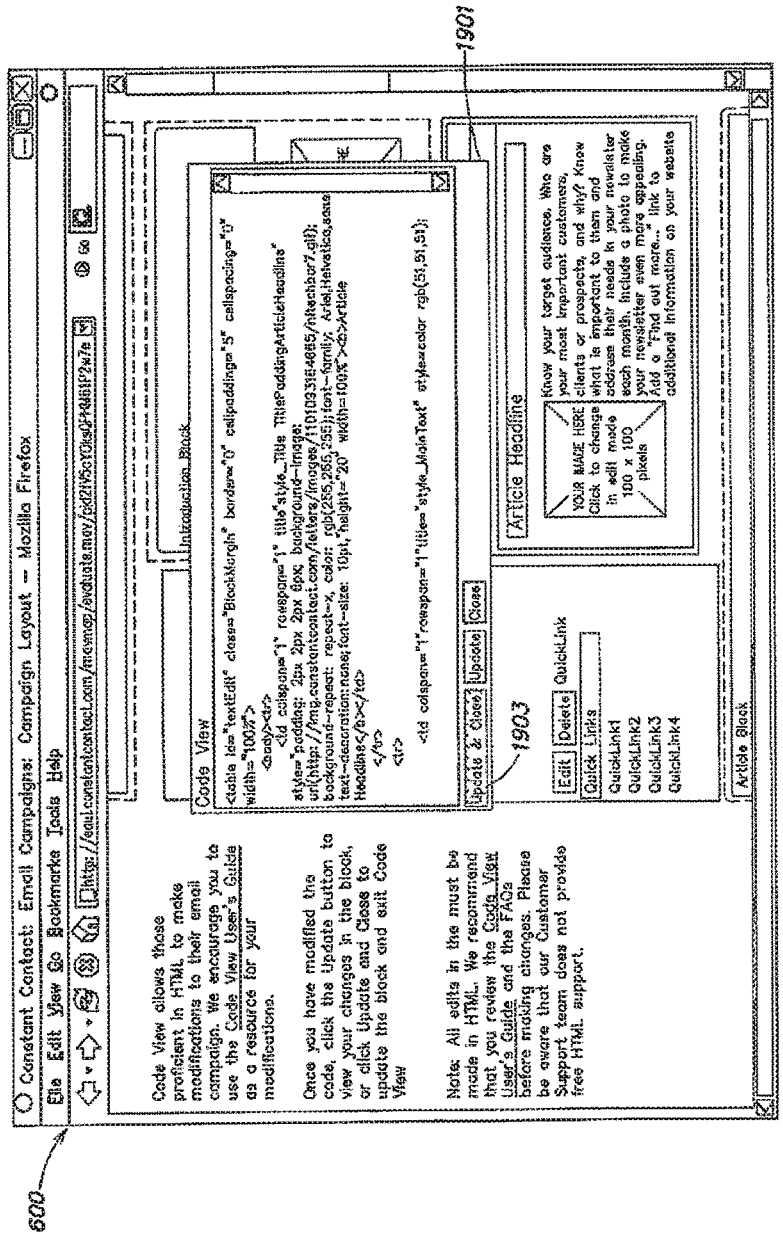
FIG. 19 shows an example code view interface according to an embodiment of the instant invention.

In some embodiments, to provide further customization options to advanced users, block interface 101 may provide a user with a code view option. For example, a user may access a code view interface through block interface 1101 by selecting code view control 1115. FIG. 19 shows an example code view interface 1901. As is shown, in some implementations, a code view interface 1901 may display HTML code corresponding to the contents of a block being edited (e.g., block 801). A user having HTML coding skills may enter HTML code into code view interface 1901. Such an interface may allow a user more flexibility than the formatting and content editing otherwise available for a content of a block by allowing the user to enter any HTML tags desired for a particular block. In some implementations, when a user is finished with a code view interface 1901, the user may select an update control 1903 to incorporate the changes into a block being edited (e.g., 801).

In some implementations, a code view option may allow a user to access email design options that may otherwise be inaccessible. For example, in one implementation, open-tracking of an email message (e.g., tracking which recipients open an email message) may be enabled for all email messages by default. In some implementations, a user, however, may access a code view option and include an <OpenTracking track="false"> tag to disable opentracking for a particular email message.

In some implementations, because users may make mistakes when editing content of a block, block interface 1101 may provide a user with undo and redo functionality. For example, block interface 1101 may include an undo control 1117 and a redo control 1119. In some implementations, undo control 1117 may be selected to indicate an undo request for a previous editing or formatting of content of a block being edited (e.g., block 801). In some implementations to provide such undo functionality, indications of editing operations (e.g., adding an image, formatting text, etc.) may be stored in a stack as they as they are performed to a block. The stack may be stored by a program executed by a user computer (e.g., a JavaScript program, a web browser). The stack may be "popped" to determine a previous editing operation when the user selects undo control 1117. Once the previous editing operation is determined, a reversal of the editing operation may be performed to return contents of the block being edited (e.g., 801) to a state before the determined editing operation was performed. In some implementations, a limited number of operations may be stored in a stack allowing only a limited number of operations to be undone.

In some implementations, a user may indicate a redo request for an undone operation by selecting redo control 1119. To provide redo functionality, some implementations may include a redo stack that stores undone operations. For example, when an undo stack is "popped" to retrieve an indication of a previously performed editing operation, the indication may be "pushed" onto the redo stack. When redo control 1119 is pushed, the redo stack may be "popped" to determine a previously undone operation that may then be reapplied to the block being edited (e.g., block 801). A redo stack may be cleared, for example, after each customization performed by a user other than an undo, so that the redo stack is only populated after an undo operation.

In some implementation, editing and formatting of content of a block (e.g., block 801) may include a client level process. A current state of the block may be stored, for example, by a program on a user computer (e.g., a web browser and/or JavaScript program). In some implementations, spell checking and image uploading may be considered client level processes despite contact with a remote server because in such implementations, spell checking and image uploading may not include tracking a state of an email message by user interface system 201.

In one embodiment, a user may select a cancel control 1121 or a save control 1123 to complete an editing operation of a content block.

In some implementations, the user may select cancel control 1121 to return the content of a block being edited (e.g., block 801) to its previous state (e.g., before editing began.) To implement such functionality, the web browser delete the content of the visible Iframe used to edit the block and hide the Iframe again, thereby displaying the underlying original block. In some implementations, after the user selects cancel control 1121, editor interface 600 may return to a state similar to the one shown in FIG. 6 in which blocks may be moved, added, deleted, or selected for editing. In some implementations, canceling an edit may also clear an undo and redo stack. In some implementations, canceling an edit may not, however, remove uploaded pictures from an image server (e.g., 205B) even though an image may removed from the block being edited if the image was inserted during a canceled edit session.

In some implementations, a user may select save control 1123 to save the edits made to a block being edited (e.g., block 801). In some implementations, if save control 1123 is pressed, the contents of an Iframe in which edits are being made may be copied to the original block replacing the original content of that block and the Iframe may be hidden again. In some implementations, after the user selects save control 1123, editor interface 600 may return to a state similar to the one shown in FIG. 6 in which blocks may be moved, added, deleted, or selected for editing. In some implementations, saving edits may also clear an undo and redo stack.

In some implementations, a save function may include a database level process. A save function may include a database level function because saving to a database stores content changes to a persistent memory that may be maintained even if a user unexpectedly ends an editing session without otherwise saving changes. For example, a representation of current content of the edited block may be transmitted to a user interface system 201 and used to update a representation of the current email message stored in a local memory on user interface system 201. User interface system 201 may then transmit determine if a prior representation of the email message has been stored to in a database table (e.g., on database server 205C). If a prior version has been saved, user interface system 201 may transmit a representation of the edited block to replace a previous representation of the block in the database table. If no prior version has been saved, user interface system 201 may transmit a complete representation of a current state of the email message to the database server (e.g., 205C) to be stored in the database table.

Figure 20:
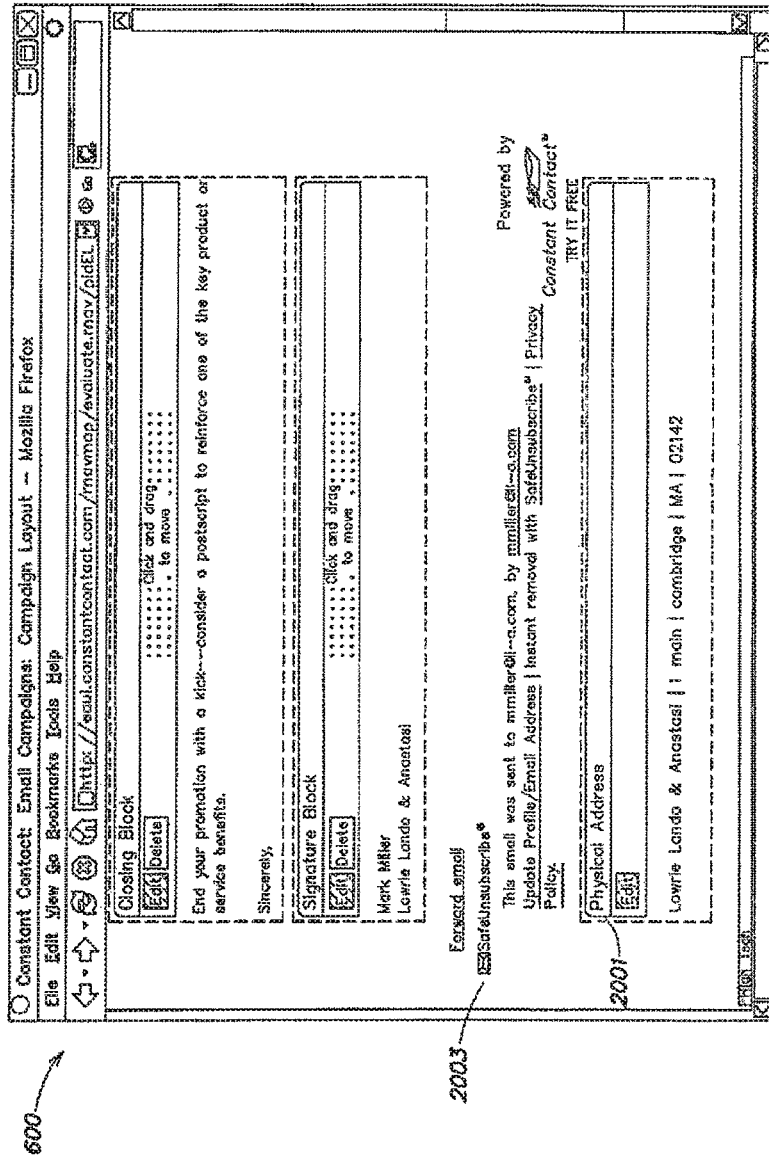
FIG. 20 shows an example editor interface displaying an example special block according to an embodiment of the instant invention.

The above described content and layout editing functionality may apply to a plurality of standard blocks in an email message. In some implementations, one or more special blocks may also be included that may be subject to limited and/or special editing treatment. FIG. 20, for example shows an example special block, physical address block 2001. Such special blocks, may, for example be used to include content that may be required by law or desired by a provider of the visual editor (e.g., advertisements). For example, some jurisdictions' anti-spam laws may require certain email messages to include an address of a sender as is included in physical address block 2001.

Figure 21:
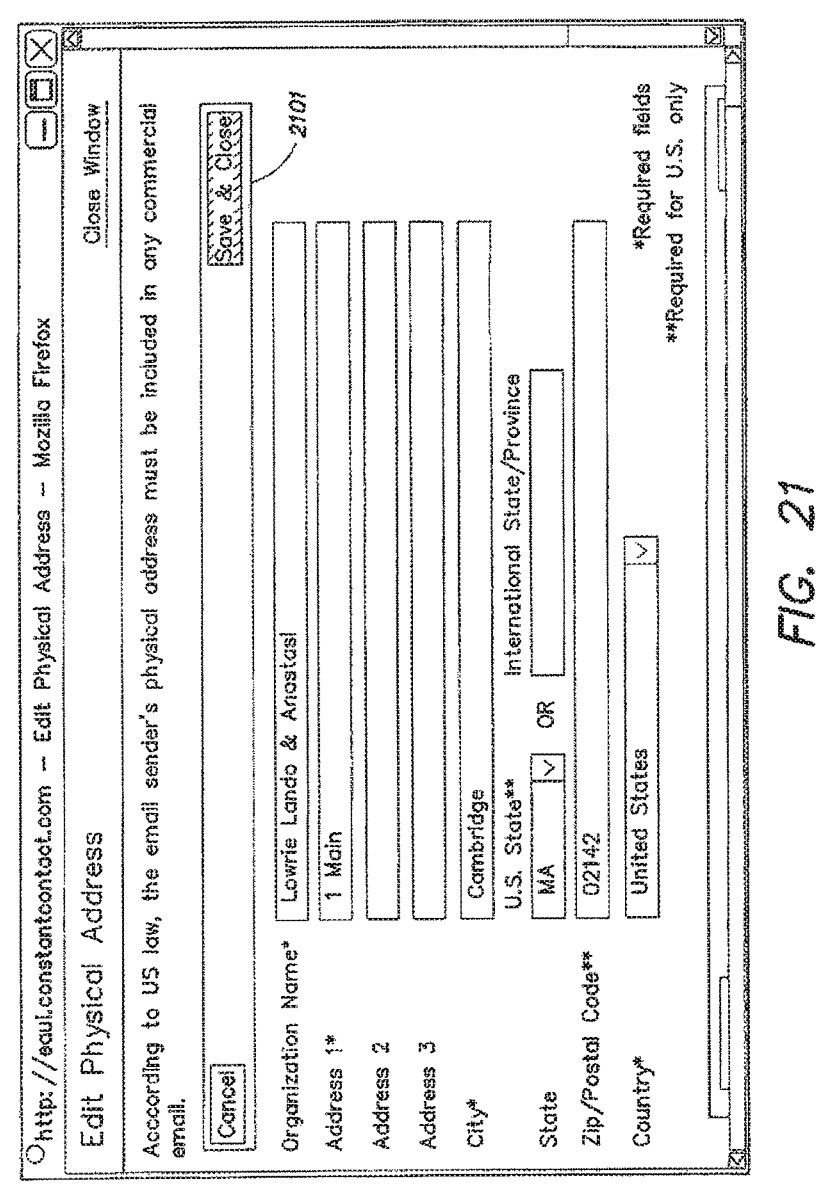

In the example implementation of physical address block 2001, delete, movement and adding functionality has been disabled. Initial content of physical address block 2001 may be supplied from a profile of a user of the visual editor or basic information such as that entered at block 305 of process 300. In some implementations, physical address block 2001 an edit control selected to edit physical address block 2001 through a special block editing interface, an example of which is shown in FIG. 21. A user, for example may enter new physical address information and may save the new information by selecting the save control 2101. Saving content of a physical address content element may be a database level process similar to saving edited content of other content blocks.

FIG. 20 shows a footer element 2003 that is another example of a special block. In some implementations, footer element 2003 may not be deleteable, moveable cloneable, or editable through editor interface 600. In some implementations, footer element 2003 may include required information and/or advertising information for a provider of editor interface 600 (e.g., Constant Contact). In some implementations, a user may select option regarding footer element 2003 through an interface similar to the physical address interface or the basic information and options interfaces, both described above. For example, in some implementations, a user may select a language for footer element 2003, select a design from among a plurality of footer designs, and/or choose a custom footer at process step 305, described above.

Through editor interface 600, a user may perform any number of content and layout customizations to any number of blocks. When the user is finished, or believes he or she is finished, or wants to preview the progress of the design in a manner better resembling a final output, the user may select on preview control 621, shown in FIG. 6.

When the user selects preview control 621, a request may be made to a server (e.g., user interface system 201) to provide a preview of a custom email message. In some implementations, the server may respond by generating the preview (e.g., using a renderer as described below) and by transmitting a representation of a preview of the custom email message to the user.

Figure 22:
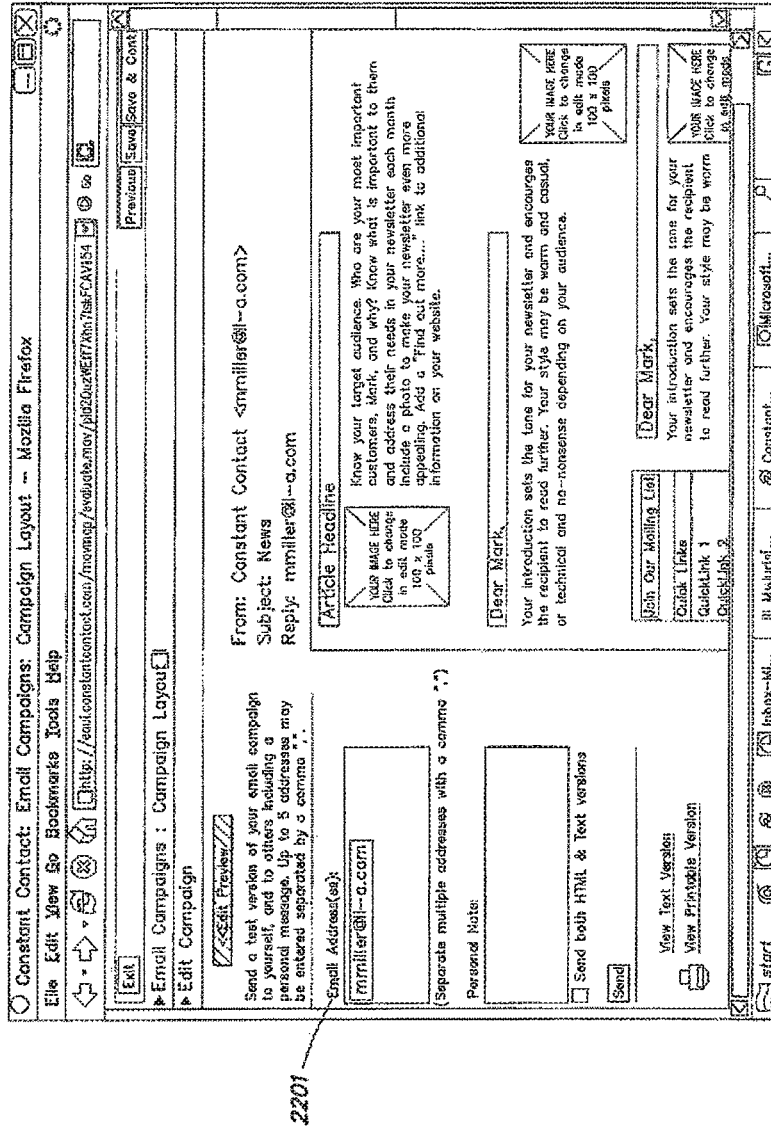
FIG. 22 shows an example preview representation of an email message according to an embodiment of the instant invention.

FIG. 22 shows an example implementation of a preview interface displaying a preview representation. In some implementations, as shown in FIG. 22, a preview interface may include a preview pane in which a preview representation of the custom email message is displayed. The preview pane may display a current state of an email message that has been edited by the user through editor interface 600, including a header element but excluding editing elements such as borders, title bars and control buttons that may be displayed in editor interface 600 to enable editing functionality. In some implementations, the preview representation may include an approximation of the custom email message as the custom email message may appear to a recipient of the custom email message (e.g., through an email reading client).

In some implementations, preview generation may include a server level process. In some implementations, the representation of the preview of the custom email message may be generated by a preview renderer. In some implementations, the preview renderer may be executed, for example, by a user interface system 201. In some implementations, a preview renderer may operate substantially similar to a visual editor renderer. For example, a preview renderer may accept a document object model as input (e.g., a document object model representing a current state of an email message being edited by the visual editor) and output at least a portion of a user interface (e.g., a webpage) based on the input document object model. In some implementations the renderer may be configure to generate a preview representation in which any links within the document are not active, in which JavaScript and/or other programming elements that provide content and layout customization features in a visual editor are not active, and in which data driven elements are not merged with data sources.

Because, in some implementations, user interface system 201 tracks content and layout customizations to an email message being customized by maintaining a representation of a current document object model, as described above, user interface system 201 may generate a preview of a custom email message without querying a database table for information regarding the custom email message. By limiting such database queries, generation of a preview representation of a custom email message may be performed at higher speeds. Furthermore, a user (e.g., user computer 203) does not need to transmit a representation of a current document object model to such a server, so bandwidth used in a preview generation operation may be minimized.

In some implementations, the preview interface may include a preview control panel 2201. As shown in FIG. 22, in some implementations, preview control panel 2201 may include controls to transmit test letter to one or more desired email addresses. Such test letters may give a user and any desired other recipients another view of the final output of an email design (e.g., a view from an email client rather than a webpage).

In some implementations, a user may exit a preview mode by selecting an exit preview mode control. A user, for example, may be returned to editor interface 600 such as the interface shown in FIG. 6 after selecting an exit preview mode control.

Figure 23:
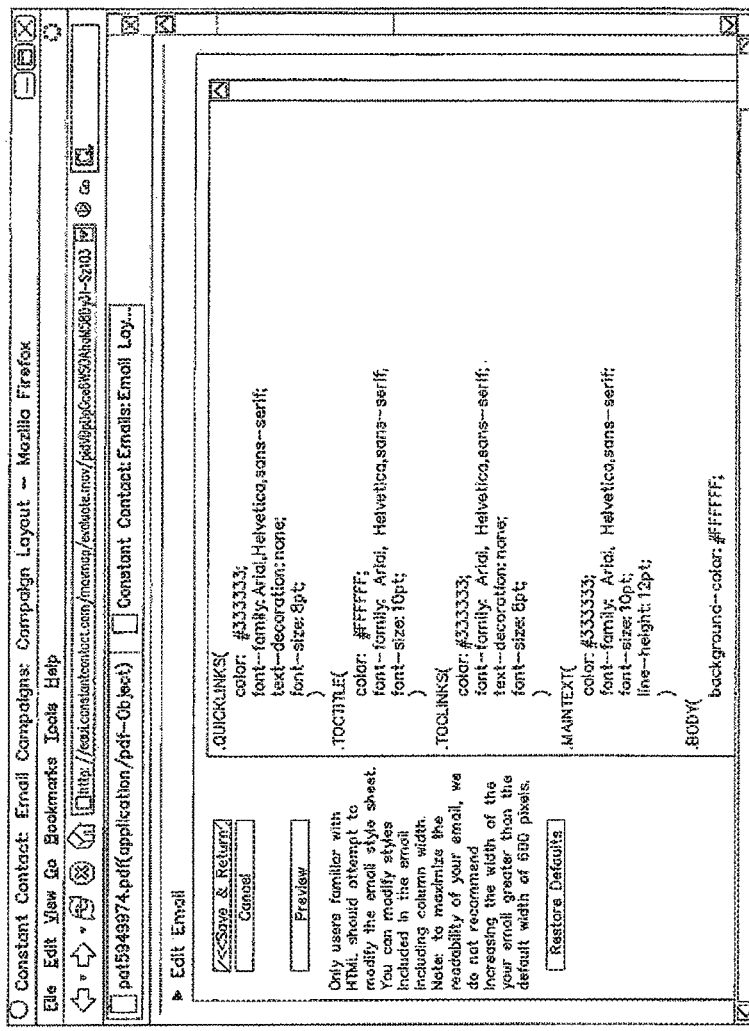
FIG. 23 shows an example style sheet editing interface according to an embodiment of the instant invention.

In addition to the customization and preview functionality described above, some embodiments, a control panel 619 of a visual interface may include a style sheet editing control (not shown). In some implementations, a user may select the style sheet editing control to access a style sheet editing interface through which a user may edit cascading style sheet code of an email message being edited. FIG. 23 shows an example of a style sheet editing interface through which a user can edit cascading style sheet code defining style sheet classes of the email message displayed in FIG. 6. For example, a user may edit color, font family, text description, and font size elements of the quick links style sheet class through the example interface of FIG. 23.

In some implementations, a user may finished editing the cascading style sheet code of an email message by selecting either a cancel control to return the style sheet code to its preedited state, or a save control to save the style sheet code edits and return to editor interface 600 in which the code edits are incorporated. In some implementations, a user may also access a preview mode by selecting a preview control to display a preview representation of an email message including edited style sheet code.

In some implementations, saving edited style sheet code may include a server level process. In some implementations, for example, when a user selects a save control and/or a preview control, an updated representation of the style sheet code may be transmitted to and tracked by user interface system 201. In some implementations, user interface system 201 may update a stored representation of a DOM based on the updated representation of the style sheet code of the email message being editing.

Figure 24:
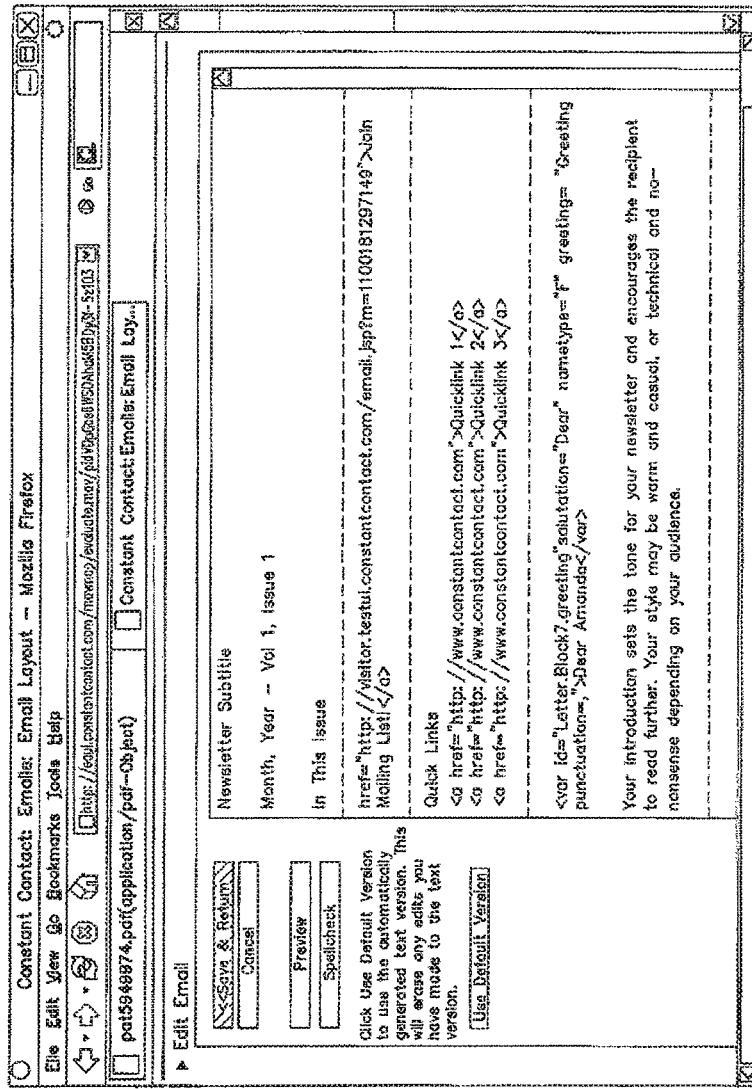
FIG. 24 shows an example text letter editing interface according to an embodiment of the instant invention.

In some embodiments, a control panel 619 of editor interface 600 may also include an edit text letter control (not shown). In some implementations, a user may select on an edit text letter control to access a text letter editing interface. FIG. 24 shows an example text letter editing interface. Through such a text letter editing interface, a user may edit a text version of an HTML email message being edited by through editor interface 600. For example, the message being edited by editor interface 600 may include HTML elements that may not be viewable through certain email clients, and/or certain recipients may prefer to receive a text only version of an email message rather than an HTML version. Such preference may, in some implementations be stored in a recipient list similar to traditional data driven elements. A text letter editing interface may provide a user with the ability to separately edit a text version of an email rather than tying a text version of an email message directly to an HTML version of an email message.

As shown in FIG. 24, a user may type into an editing pane of a text letter editing interface to change (e.g., add, delete) content of a text version of an email message. As shown, in some implementations, a text version of an email message displayed through the text editing interface may be based on an HTML version of an email message edited through editor interface 600. For example, as shown in FIG. 24, the text version of an email message display in the edit text letter interface includes content (e.g., text) and a layout (e.g., order of content) of the HTML email message displayed in editor interface 600.

In some implementations, the representation of a text letter version of the custom email message may be generated by an edit text letter renderer. In some implementations, the edit text letter renderer may be executed, for example, by user interface system 201. In some implementations, an edit text letter renderer may operate substantially similar to a visual editor renderer and/or a preview renderer. For example, an edit text letter renderer may accept a document object model as input (e.g., a document object model representing a current state of a email message being edited through editor interface 600) and output at least a portion of a user interface (e.g., a webpage) based on the input document object model. In some implementations the edit text letter renderer may be configure to generate an editable text version of an HTML email message being edited through editor interface 600.

In some implementations, a user may finished editing the text letter version of an email message by selecting either a cancel control to return the text version to its preedited state, or a save control to save the text version and return to editor interface 600 in which the HTML version of the email message is displayed. In some implementations, a user may also access a preview mode by selecting a preview control to display a preview representation of a text letter version of an email message. Such preview functionality may be substantially similar to preview of an HTML version of an email message, as described above.

In some embodiments, editor interface 600 may provide functionality to edit an email message for a particular device/display or device/display type. For example, a user may edit an email message for display on a cellular telephone, personal digital assistant, televisions, billboards, and/or any other mobile or stationary device. Because such devices or display types format displayed information in a unique way, a user may desire to specially edit an email message to appear properly on the display or device type. Such functionality may be enabled substantially similarly to the edit text letter functionality described above. Such functionality may utilize a device or display specific renderer as described below.

In some embodiments, editor interface 600 may provide functionality to edit an email message for other formats than a text format in addition or as an alternative to the edit text letter functionality described above. For example, some implementations may allow a user to edit an email to be transmitted specifically in Word, PDF, SMS, MMS, and/or any other desired format. Similar to display and device types described above, different formats may result in different display output, so a user may desire to specifically design an email message being sent in a particular format.

In some embodiment, a visual editor may provide functionality to edit an email message for a particular email client or other computer program. For example, in some implementations, a visual editor may allow a user to edit an email to be read through a web-based email client differently from a stand alone email client. Similar to display and device types described above, different computer programs may display email differently, so a user may desire to specifically design an email message being sent in a particular computer program.

Figure 25:
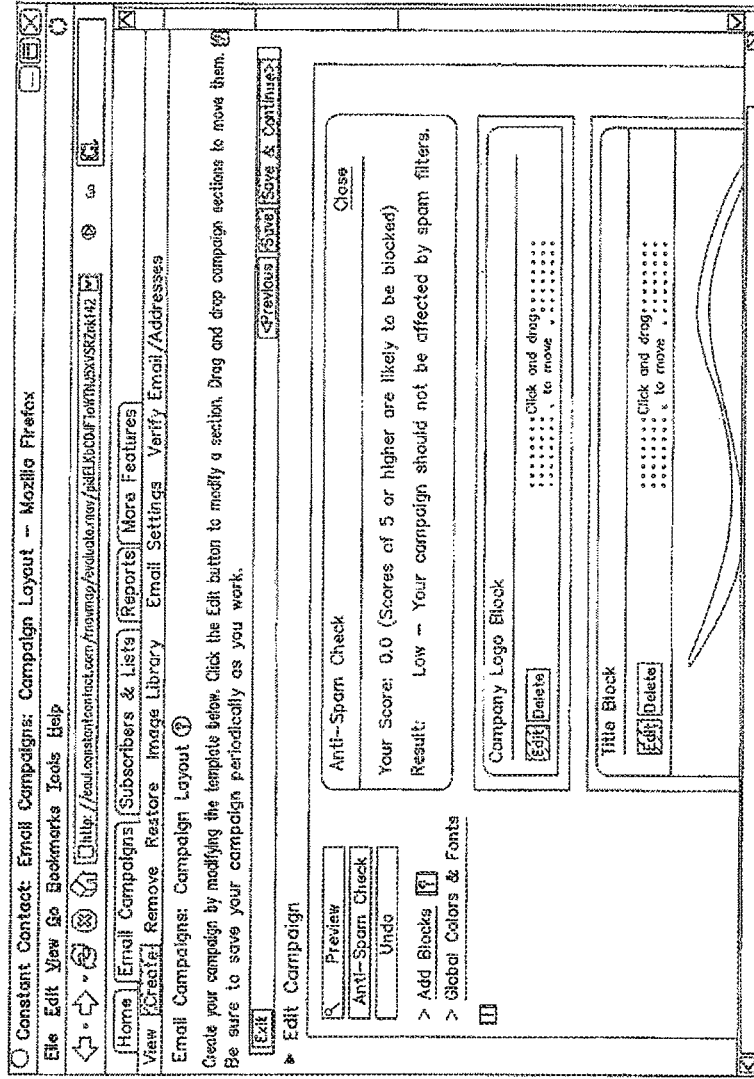
FIG. 25 shows an example anti-spam interface according to an embodiment of the instant invention.

In some embodiments, a control panel 619 of editor interface 600 may further include an anti-spam control. In some implementations, a user may access an anti-spam interface by selecting an anti-spam control. FIG. 25 shows an example anti-spam interface according to one implementation of the instant invention. As shown in FIG. 25, an anti-spam interface may display a spam ranking that indicates a chance that an email message may be blocked by a spam filter (e.g., a spam filter of ISP mail server 205F).

Anti-spam functionality may include communicating a representation of a currently edited email message to a remote server (e.g., user interface system 201). In some implementations, the remote server may process the representation of the current email message according to one or more anti-spam algorithms. For example, in some implementations, an anti-spam algorithm may count a number of repeated word, count a number of extra long word, count an amount of punctuation, count a number of flagged words, determine an amount of an email message constructed from obscured HTML, and/or determined any other characteristic of an email message. Based on such a determined characteristic, an anti-spam algorithm may assign an anti-spam score that indicates the chance the message may be blocked by a spam filter. In some implementations, an algorithm may assign such a score based on observed spam filtering, based on information received from one or more spam filter providers (e.g., ISP's commercial software developers), and/or based on any other criteria.

In some implementations, an anti-spam check may be performed using a tracked representation of an email message in memory of user interface server 201. By using such information to perform an anti-spam check, the anti-spam check may be performed more quickly than if a database query were performed to retrieve a stored representation of an email message from a database server (e.g., 205C).

In some embodiments of a visual editor, in addition to the described functionality above, a user may also add pre-authored content to an email message being edited through editor interface 600. In some implementations, a user may select preauthored content from a library of such content. For example, the library of pre-authored content may, in some implementations, include a generic block (e.g., an article block, an introduction block) with written content that may be applicable to a variety of email messages. In some implementations, a library of pre-authored content may be specific to a particular chosen template document (e.g., a template designer may generate a set of generic blocks that may be relevant to email messages created using a designed template). In some implementations, a library of pre-authored content may be specific to a particular user (e.g., a user may save a pre-authored block to the library similar to an image and access the pre-authored block in future email messages). In some implementations, a user may access such a library of pre-authored content through control panel 619 of editor interface 600.

In some embodiments, when a user finishes customization of an email message, either temporarily (such as to take a break) or permanently (such as to transmit a finished version), a user may select a global save control to perform a database level save of an email message. For example, when a user selects a global save control, a request may be transmitted from a user (e.g., user computer 203) to user interface system 201. In some implementations, the server may save a representation of a remotely stored document object model corresponding to an email message being edited through editor interface 600 to a database table (e.g., a database maintained by database server 205C).

In some embodiments, if a user finishes customizing an email message, the user may select on a save and continue control to both save the current email message and continue to a transmission interface.

Returning to process 300 shown in FIG. 3, after a user has been provided with an editor interface (e.g., 600) at block 307 and completes customizing an email message, as indicated at block 309, process 300 may include processing and transmitting a custom email message.

Figure 26:
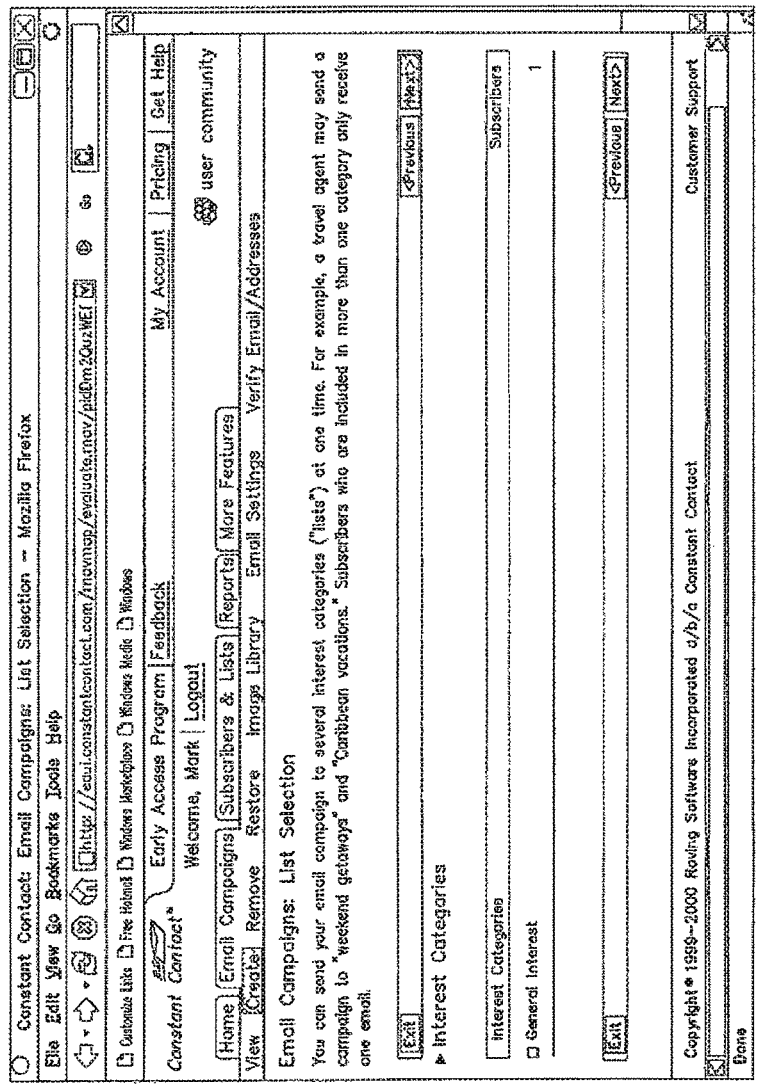
FIG. 26 shows an example interface through which a user may select one or more recipient lists according to an embodiment of the instant invention.

In some embodiments, processing a custom email message may include selecting one or more recipients of the email message. FIG. 26 shows an example interface through which a user may select one or more predefined recipient lists. A user for example may select check box 2601 to select the associated recipient list and the select next to indicate transmission to that recipient list is desired.

Figure 27:
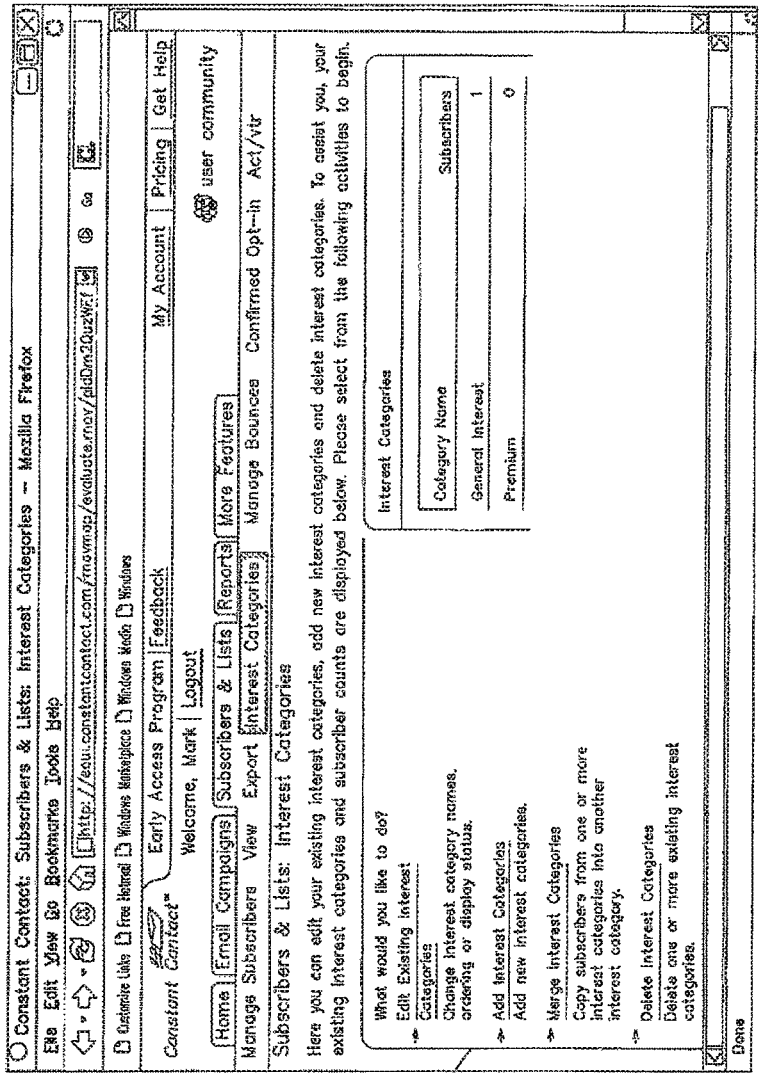
FIG. 27 shows an example recipient list management interface according to an embodiment of the instant invention.
Figure 28:
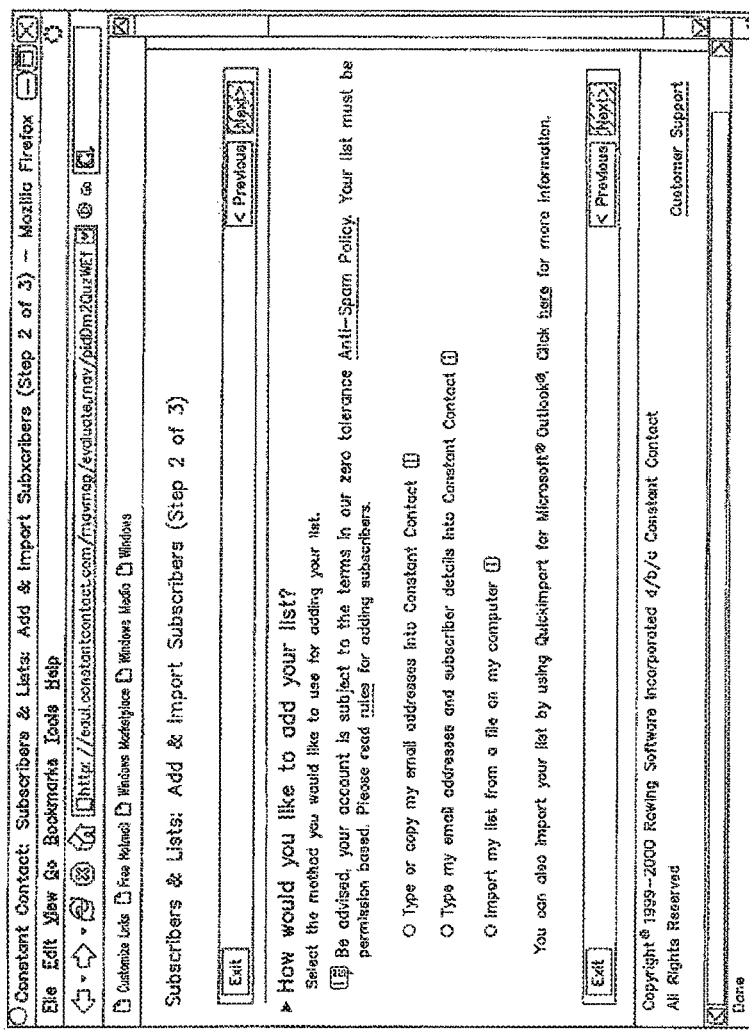
FIG. 28 shows an example interface that may be used in some implementations to create a new recipient list according to an embodiment of the instant invention.

In some embodiments, a user may create and/or alter recipient lists before or after customizing an email message. For example, FIG. 27 shows an example recipient list management interface. As shown, the example user has two recipient lists, a general interest list and a premium list. The user may select to generate additional lists, select an existing list to edit, delete an existing list and/or merge one or more existing lists through a list control panel 2701. FIG. 28 shows an example interface that may be used in some implementations to create a new recipient list. A user, for example, may use such an interface to import a file containing an email recipient list (e.g., a delimited text file, an exported email list from an email client) and/or access an entry interface through which the user may type email addresses directly.

Figure 29:
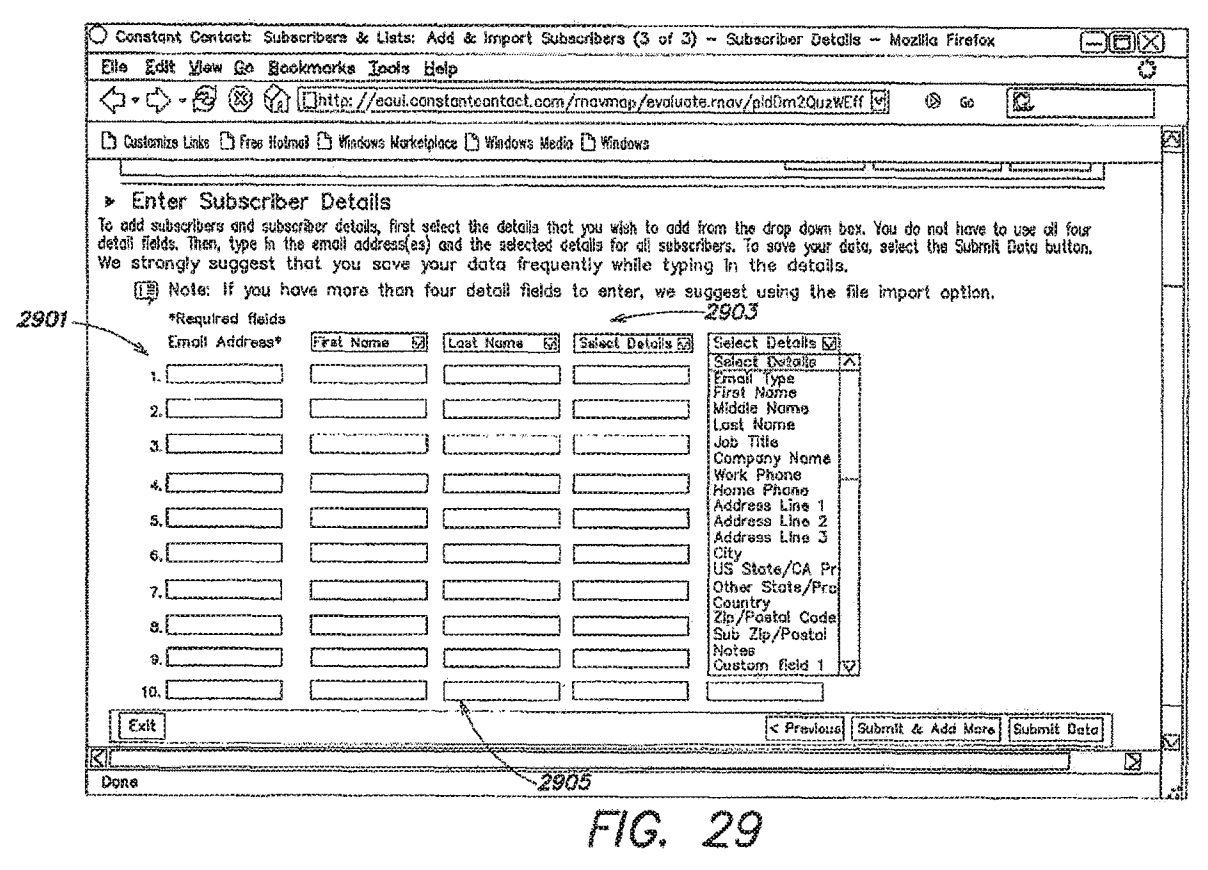

FIG. 29 shows an example entry interface that may be used in some implementations to allow a user to generate a recipient list. Through the example interface of FIG. 29, a user may enter recipient email address information by entering such information into an email address column 2901. A user may select a plurality of data driven elements to be stored for each recipient through drop down boxes 2903 and enter associated information in data driven columns 2905. Although the example interface includes four data driven columns, other implementations may include any number of data driven columns and/or an interface to add or delete such columns.

Figure 30:
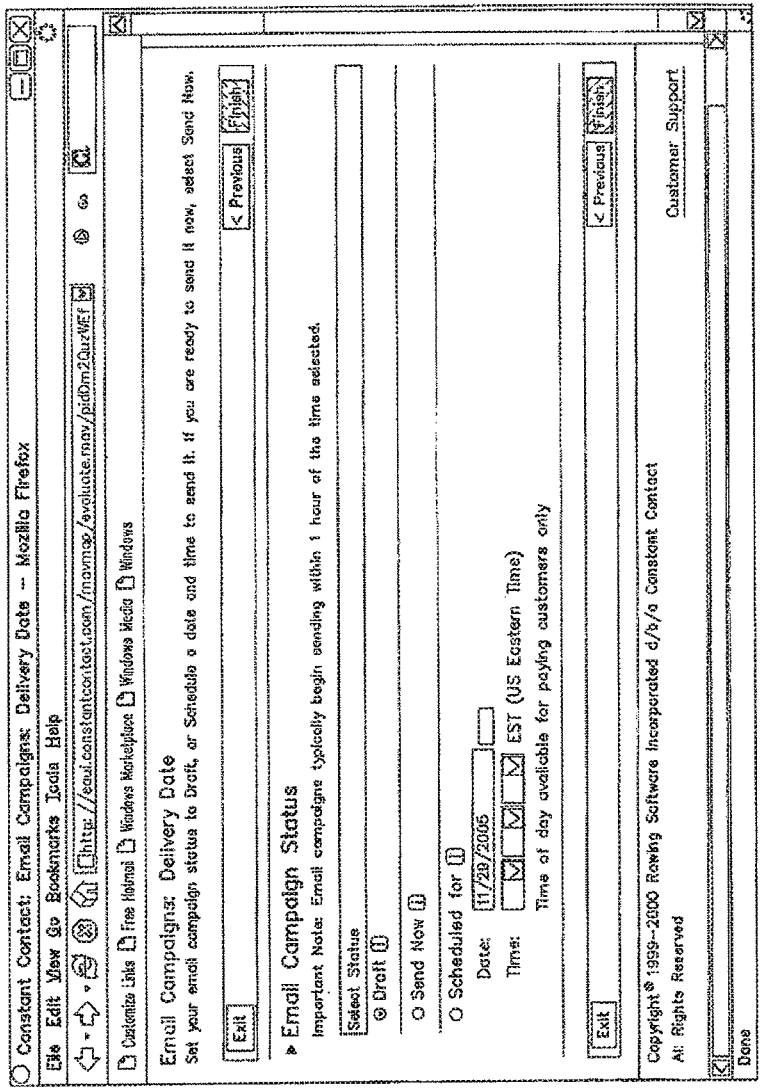
FIG. 30 shows an example status interface according to an embodiment of the instant invention.

In some implementations, after selecting one or more recipients, a custom email message may be transmitted to the selected recipients. In some implementations, after selecting one or more recipients, a user may access an email status interface to schedule future transmission of an email message, immediate transmission of an email message, or save an email message as a draft. FIG. 30 shows an example status interface. After selecting a desired transmission action a user may select a finish control to schedule transmission, transmit an email message, or save the campaign as a draft. A user, in some implementations, may log on to a system (e.g., using a user name and password) to access such a status interface to change or create a transmission schedule.

In some embodiments, transmission of email messages to recipients (e.g., at a scheduled time) may include generating a plurality of representations of a custom email message. For example, in some implementations, a renderer (e.g., a preview renderer) or other mail generating process may be executed by a server (e.g., a mail farm server) to generate a representation of a custom email message having a desired content and layout without editing elements such as those that are visible through an editor interface (e.g., similar to a preview representation as described above). In some implementations, a preview renderer may be used to generate such an email message. In some implementations, the mail renderer or a separate renderer process may generate text letter representations for users desiring text only representations of a custom email message. In some implementations, such text letter representations may be similar to the edit text letter representations described above without editing functionality.

In some implementations, a preview renderer or a separate merge process may be configured to complete data driven elements in a custom email message be entering appropriate information from a recipient list stored in a database table (e.g., on database server 205C) to generate a plurality of final email messages that may then be transmitted to each respective desired recipient.

After transmitting email messages, process 300 may end at block 311.

Renderers

In some embodiments, various representations of email messages may be generated by one or more renderers executed on one or more servers. In some implementations, such renderers may be substantially modular. For example, in some implementations each renderer may accept a substantially or exactly similar input (e.g., a representation of a document object model). Each renderer may output a different representation of an email message depending on the purpose of the respective renderer and/or other renderer parameters. Such modularity allows a single representation of an email message to be used as input to generate a plurality of different output representations, rather than requiring multiple representations of a single email message to be maintained.

For example, a preview renderer may generate a preview representation of an email message (text and/or HTML depending on render parameters), test letter sent through a preview interface, and live output representations of an email message, an edit text letter renderer may generate an edit text letter representation of an email message, and a visual editor renderer may generate a visual editor representation of an email. An appropriate renderer may be selected based on a received indication from the user (e.g., request for a preview, a request to transmit a live letter, a request to access the editor interface, etc.).

In some implementations, the visual editor render may insert a plurality of JavaScript hooks into an HTML document (e.g., associated with title bars, buttons, etc.) representing an email message. In some implementation, this output may include the DOM that user interface system 201 and/or user computer 203 maintains. In some implementations, JavaScript event handlers may be applied to the plurality of hooks. In some implementations, JavaScript code may also disable all the links and form submission in an email message for certain versions of an email message.

In some implementations, the output for preview, test letters and live letters (HTML and text) are generated by the preview renderer. For preview and text letters, the renderer may add hooks to the links to not track when a user selects them. For text letters, the renderer may strip out all the HTML tag and apply text letter rules, such as handling links and images differently. In some implementations, the output for text letter generated for the edit text letter functionality may be slightly different from the regular text letter (preview, test letter, and live letter). The output for example may keep the links, greeting and subscriber data tags so that when the text letter is rendered for preview, text and live mode, the renderer tracks the links and expands individual recipient information.

In one example implementation of a set of three renderers (e.g., visual editor, preview, and edit text letter renderers), each renderer may include a parser process to parse a representation of a document object model received as input. In one implementation, a standard parser such as the stAX parser may be used.

With respect to HTML email messages, for a visual editor, preview, test letter and live letters, the renderers may parse out all anchor tags (<a>) and regenerate them by adding custom tracking code that allows tracking of each select a recipient or user makes on each one of the links on the email. The renderers may also parse out the image tags (<img>) to make sure to pull the right image from an image library. In some implementations, if an image is from an image library and has been deleted from the image library, a renderer may place a place holder image in its location to indicate that the image that goes on that spot has been deleted.

Further, the renderers may parse out the special tokens where the greeting and recipient information (e.g., data driven elements) is placed. In some implementations, for the greeting tokens, renderers may make the correct substitution based on the user selection on what they want to display for the greeting. For example, if using the primary greeting, the renderer may insert a recipient's information (First Name, Last Name, First & Last Name, etc.). If the recipient's information is not available, the renderer may default back to the secondary greeting. In some implementations, for the recipient information substitution, a blind substitution may be performed (i.e., if the specific recipient's info is unavailable, display a blank value). In some implementations, for visual editor and preview representations the renderers may insert the user's (i.e., the person editing the email message) information in greeting and other data driven locations.

Furthermore, the renderers may add a permission reminder to the top of the email if the user has checked off to add permission reminder to the email. The renderers may also add footer information to the bottom of the email. Even though in some implementations a user may not be able to fully edit all content of a footer, there may be certain things the user can edit and a renderer may need to determine. For example, a user can specify the language for the footer, a user can specify whether to add/remove an update profile sentence from the footer, user can request a footer not containing a logo, a user can request an entirely customized footer With respect to preview, test and live HTML messages, the renders may further convert all style sheet classes into inline style tags, similar to converting styles into edit mode of a block as described above. In some implementations, because some email clients do not support inline style, to preserve some of the look and feel of an email message, the renderers may convert some of the style into regular HTML attributes like font styles, background color and image and border color.

For example, in some implementations, in the case of background color and image and border color, the renderers may add the respective attributes to the tag that has the reference to the style class, i.e., bgcolor, background, and border-color. For example a table using a style sheet defined as:

```
.myclass{
    background-color: #ff0000;
    background-image: url(http://some.image.here);
    border-color: #0000ff;
}
``` may be converted into a table defined as:

```
<table
        style="background-color: #ff0000; background-
    image:url(http://some.image.here); border-color:#0000ff;"
    bgcolor="#ff0000"
    background="http://some.image.here"
    border-color="#0000ff"></table>
```

As another example, in some implementations, for font styles, the renderers may add a <font> tag after the tag that makes references to the style class. Also, in some implementations, font-size may be converted into an absolute font size value. For example for a span element using a style class defined as

```
.myclass{
    font-family: verdana;
    font-size: 10pt;
    color: #000000;
}
``` may be converted into:

```
<span style="font-family:verdana;font-size:10pt;color:#000000;">
<font face="verdana" size="2" color="#000000"></font></span>.
```

With respect to live letters only, the renderers may add an open tracking element to some email messages that determines if a recipient opens an email message and/or selects one or more links within an email message and transmits an indication of such tracking to a remote server (e.g., open/click tracking server 205J). With respect to preview and test letters only, the renderers may add a flag to all links indicating that tracking of the links or opening of the email should not occur.

With respect to text versions of an email message, the renderers may perform different function than with respect to HTML versions of an email message.

For example, with respect to preview, test letters, live letters and edit text letter mode the renders may strip out all the tags. In some implementations, the renderers keep track of the number of line breaks needed to be added based on the tags (e.g., convert a <p> into 2 line breaks). In some implementations, if more that one tag appears consecutively before any text, the renders may use the tag corresponding to the largest line break to track the line breaks needed. For example, in the content:

```
<p>
    <div>Hello World</div>
</p>
``` the <p> tag may resolve to two line breaks and the <div> tag may resolve to one. In this case, the renderers may honor the tag with the largest number of line breaks and ignore the other one resulting in two line breaks before the "Hello World" text rather than three.

In some implementations, the renderers may insert line breaks so that text may wrap correctly. For example, a line break may be added after a predetermined number of characters. In one implementation, the predetermined number of characters may include approximately eighty characters so that text does not run passed a standard display screen's display limitations.

In some implementations, the renderers may add a permission reminder to the top of the email if the user has checked off to add permission reminder to the email. And, in some implementations, the renderers may add the footer information to the bottom of the email. In some implementations, for <img> tags, if the <img> is wrapped by an <a> tag and the <img> tag has a non-empty alt attribute, the renderers may treat the <img> tag as a text link using the value from the alt attribute. If the <img> tag has no alt attribute or no <a> tag wraps the <img> tag, the renderers may remove the image completely.

With respect to preview, test, and live letters only, the renderers may further construct text version links for the email message. For example, for <a> tags including a valid href attribute, the renderers may save that value use the href value to construct a link text based on the next appearing text element. For example, the code:
    <a href="http://some.where.on.the.web">click here</a>
may be converted into:
    click here [http:://our.tracking.bug?http://some.where.on.the.web].

In some implementations, the renderers may also parse special tokens where greeting and recipient information may be located. In some implementations, for the greeting tokens, renderers may make the correct substitution based on the user selection on what they want to display for the greeting. For example, if using the primary greeting, the renderer may insert a recipient's information (First Name, Last Name, First & Last Name, etc.). If the recipient's information is not available, the renderer may default back to the secondary greeting. In some implementations, for the recipient information substitution, a blind substitution may be performed (i.e., if the specific recipient's info is unavailable, display a blank value). In some implementations, for preview representations the renderers may insert the user's information in greeting and other data driven locations.

With respect to live letters only, the renderers may further add an open tracking element to some email messages that determines if a recipient opens an email message and/or selects one or more links within an email message and transmits an indication of such tracking to a remote server (e.g., open/click tracking server 205J). With respect to preview and test letters only, the renderers may add a flag to all links indicating that tracking of the links or opening of the email should not occur.

With respect to edit text letter mode, the renderers may leave <a> alone rather than replace them as in other modes. In some implementations, special tokens such as greeting and recipient data driven elements may be left alone in this mode.

Although the above description of process 300 and the example renderer descriptions include three renderers (i.e., preview, visual editor, and edit text letter), it should be understood that any desired renderers may be used in other embodiments of the instant invention. Moreover, it should be understood that a single process or no process at all may perform the functions of a renderer process in still other embodiments of the instant invention.

In some embodiments, for example, one or more renderers may be configured to generate representations of an email message designed for a particular device or display type. In some implementations, the above described preview, visual editor, and/or edit text letter renderers may be configured with such functionality by inputting a device parameter into the renderers in addition to a representation of a DOM. In some implementations, rather than the above described preview, visual editor, and edit text letter renderers, alternative and/or additional renderers may be configured with such functionality (e.g., device specific renderers).

In some embodiments, for example, a renderer may generate a representation of an email message that is designed to be delivered to a recipient using a particular device type and/or edited through a particular device type. For example, in some implementations, a renderer may generate a representation of an email message that is designed to be edited (e.g., through a visual editor) on one or more of a cellular telephone, a personal digital assistant, and/or any other device (mobile or stationary). Such a representation may be designed specifically for the device type so that functionality and/or usability may be optimized for the device type. For example, because some portable devices have smaller display screens than stationary device, an editor interface renderer for a portable device may optimize a format of an email representation for portable devices (e.g., cellular telephones) by minimizing certain control interfaces that would be larger for a visual editor optimized for a stationary device (e.g., desktop computers) and/or adjusting a number of characters displayed per line to fit a display size.

As another example, some device or display types may support a different set of programming formats (e.g., HTML) or programming languages (e.g., JavaScript). A render may be configured to optimize a representation of an email message to be displayed using the supported set of programming formats and/or functions. For example, in some implementations, style sheet classes may be unsupported and may be replaced with inline class, certain JavaScript or other programming function may be unsupported and may be replaced with other supported elements, and/or HTML may not be supported at all and may be replaced with another programming format (e.g., SMS, MMS, a proprietary input, etc.).

In some implementations, a renderer may generate a representation of an email message that is designed to be viewed by a recipient using one or more particular device or display type (e.g., cellular telephone, personal digital assistant, televisions, billboards, and/or any other mobile or stationary device), programs (e.g., web-based email client) or formats (e.g., Word, text, HTML). Such a representation may be optimized for display on the particular device or display type, program, or format. As described above with respect to optimizing for editing on a particular device type, optimizing for viewing on a particular device type, program or in a particular format may include changing format, programming, and/or any other elements of a representation may be optimized for such display.

In some embodiments, renderers may be configured to provide special editing functionality for specific target devices, formats, and/or programs. An example of such a renderer, the edit text renderer, is discussed above. In some implementations, other such renderers may generate a representation of an email message that may be edited to generate email versions particular to other formats than text (such as Word, PDF, etc), particular to target devices (such as mobile devices), and/or particular to target programs (such as web-based email clients). Such renderers may function substantially similar to the edit text renderer described above with configuration to generate an editable version of an email for a particular format, device, and/or target program rather than text.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the scope of instant invention. Accordingly, the foregoing description and drawings are by way of example only.

What is claimed is:

1. A computer-implemented method for generating at least one custom email message based, at least in part, on a selected template document and input from a user of a computer system, the computer system having a display, the method comprising:
   A) presenting, to the user in the display of the computer system, an editor interface displaying an initial approximation of an email message comprising a plurality of content blocks within a plurality of panels defined in the selected template document, the editor interface further displaying a panel control interface corresponding to a respective panel in the plurality of panels;
   B) accepting, through the panel control interface of the editor interface, at least one customization of at least one of a content of at least one of the plurality of content blocks of the respective panel of the plurality of panels and a layout of the plurality of content blocks of the respective panel of the plurality of panels; and C) displaying through the editor interface a customized approximation of the email message based, at least in part, on the initial approximation of the email message and the at least one customization.

2. The method of claim 1, wherein the initial approximation includes a representation of a template document.

3. The method of claim 2, wherein the template document includes an extensible markup language document.

4. The method of claim 2, further comprising D) determining at least one control element of a control panel of the editor interface based, at least in part, on the template document.

5. The method of claim 1, wherein the at least one customization includes a customization of the content of the at least one of the plurality of content blocks.

6. The method of claim 5, wherein the customization of the content includes at least one of a customization of textual information, a customization of graphical information, a customization of data-driven information, a customization of partner information, and a customization of link information.

7. The method of claim 5, further comprising D) presenting, through the editor interface, a block interface allowing the user to customize the content of the at least one of the plurality of content blocks.

8. The method of claim 7, wherein the block interface includes a hypertext markup language Iframe.

9. The method of claim 7, wherein D) includes converting at least one cascading style sheet style class to at least one inline hypertext markup language style tag.

10. The method of claim 1, wherein the at least one customization includes a customization of the layout of the plurality of content blocks.

11. The method of claim 10, further comprising D) presenting, through the editor interface, at least one intermediate representation of the customization of the layout.

12. The method of claim 11, wherein the at least one intermediate representation includes a representation of a movement of the at least one of the plurality of content blocks from an initial position to a desired position.

13. The method of claim 11, wherein the at least one intermediate representation includes an indication of a location at which a new content block may be added.

14. The method of claim 1, further comprising D) generating the initial approximation.

15. The method of claim 14, wherein D) comprises inserting at least one programmatic hook into a representation of a hypertext markup language document.

16. The method of claim 1, wherein the webpage includes an AJAX based webpage.

17. The method of claim 1, further comprising D) generating the customized approximation by updating at least one document object model based, at least in part, on the at least one customization.

18. The method of claim 1, further comprising:
D) accepting, through the editor interface, a global format change; and
E) applying the global format change to the email message.

19. The method of claim 18, wherein E) includes changing at least one attribute of at least one cascading style sheet class based, at least in part, on the global format change.

20. The method of claim 1, wherein B) includes accepting the at least one customization through the editor interface while displaying at least a portion of the initial approximation.

21. The method of claim 1, further comprising D) inserting a pre-authored content block into the email message.

22. The method of claim 1, further comprising:
D) accepting, through the editor interface, at least one indication of a request to perform at least one of a spell check, an anti-spam check, and an insertion of data-driven content; and
E) performing the at least one of the spell check, the anti-spam check, and the insertion of data driven content.

* * * * *